United States Patent
Kim et al.

(10) Patent No.: US 11,797,450 B2
(45) Date of Patent: Oct. 24, 2023

(54) ELECTRONIC DEVICE, SYSTEM-ON-CHIP, AND OPERATING METHOD THEREOF

(71) Applicant: Samsung Electronics Co., Ltd., Suwon-si (KR)

(72) Inventors: Byoungsul Kim, Suwon-si (KR); Youngsan Kang, Yongin-si (KR); Daehyun Kwon, Hwaseong-si (KR); Myong-Seob Song, Daejeon (KR); Byung Yo Lee, Seoul (KR); Yejin Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 68 days.

(21) Appl. No.: 17/232,844

(22) Filed: Apr. 16, 2021

(65) Prior Publication Data
US 2022/0066938 A1    Mar. 3, 2022

(30) Foreign Application Priority Data

Aug. 31, 2020  (KR) .................... 10-2020-0110638

(51) Int. Cl.
*G06F 12/0815* (2016.01)
*G06F 12/0804* (2016.01)

(52) U.S. Cl.
CPC ...... *G06F 12/0815* (2013.01); *G06F 12/0804* (2013.01); *G06F 2212/1032* (2013.01)

(58) Field of Classification Search
CPC ............. G06F 12/0815; G06F 12/0804; G06F 2212/1032
See application file for complete search history.

(56) References Cited

U.S. PATENT DOCUMENTS

| | | | |
|---|---|---|---|
| 6,931,495 B2 | 8/2005 | Nakada | |
| 8,219,745 B2 | 7/2012 | Bellows et al. | |
| 10,482,033 B2 | 11/2019 | Lee et al. | |
| 10,592,429 B1* | 3/2020 | Asnaashari | ........ G11C 13/0061 |
| 2006/0123187 A1 | 6/2006 | Bellows et al. | |
| 2013/0179633 A1 | 7/2013 | Kim et al. | |

(Continued)

FOREIGN PATENT DOCUMENTS

| | | |
|---|---|---|
| CN | 1801396 A | 7/2006 |
| CN | 101071398 A | 11/2007 |

(Continued)

*Primary Examiner* — Prasith Thammavong
(74) *Attorney, Agent, or Firm* — Muir Patent Law, PLLC

(57) ABSTRACT

An electronic device includes a cache memory including a memory space for storing a first cache set including a plurality of sector data and a plurality of dirty bits, each of the plurality of dirty bits representing whether corresponding sector data of the plurality of sector data are modified, a memory controller, connected to a plurality of data lines and a data mask line, for receiving the plurality of sector data and the plurality of dirty bits from the cache memory, setting a logic level of a data mask signal based on a logic level of each of the plurality of dirty bits, and outputting the plurality of sector data through the plurality of data lines and the data mask signal through the data mask line, and a memory device, connected to the plurality of data lines and the data mask line, for receiving the plurality of sector data through the plurality of data lines, and receiving the data mask signal through the data mask line.

15 Claims, 20 Drawing Sheets

(56) References Cited

U.S. PATENT DOCUMENTS

| | | | |
|---|---|---|---|
| 2014/0149685 A1* | 5/2014 | Liang | G06F 12/0886 |
| | | | 711/144 |
| 2015/0261683 A1 | 9/2015 | Hong et al. | |
| 2017/0212840 A1 | 7/2017 | Le et al. | |
| 2018/0349041 A1* | 12/2018 | Zhou | G06F 3/0619 |
| 2018/0349060 A1* | 12/2018 | Ochiai | G06F 3/0673 |
| 2019/0129716 A1* | 5/2019 | Calciu | G06F 11/1471 |
| 2019/0339906 A1* | 11/2019 | Murayama | G06F 13/1668 |
| 2020/0026664 A1 | 1/2020 | Jeong et al. | |
| 2021/0406123 A1* | 12/2021 | Nakanishi | G06F 11/108 |

FOREIGN PATENT DOCUMENTS

| | | |
|---|---|---|
| CN | 108463809 A | 8/2018 |
| JP | 3204295 B2 | 9/2001 |
| JP | 2008107905 A | 5/2008 |
| KR | 100262453 B1 | 8/2000 |
| WO | 2000050998 A1 | 8/2000 |
| WO | 2017127196 A1 | 7/2017 |

\* cited by examiner

ELECTRONIC DEVICE, SYSTEM-ON-CHIP, AND OPERATING METHOD THEREOF

CROSS-REFERENCE TO RELATED APPLICATIONS

This application claims priority under 35 U.S.C. § 119 to Korean Patent Application No. 10-2020-0110638 filed on Aug. 31, 2020, in the Korean Intellectual Property Office, the disclosures of which are incorporated by reference herein in their entireties.

BACKGROUND

The present inventive concept relates to a semiconductor memory, and more particularly to, an electronic device, a system-on-chip, and an operating method thereof.

A semiconductor memory is classified as a volatile memory, in which stored data disappear when a power is turned off, such as a static random access memory (SRAM) or a dynamic random access memory (DRAM), or a non-volatile memory, in which stored data are retained even when a power is turned off, such as a flash memory, a phase-change RAM (PRAM), a magnetic RAM (MRAM), a resistive RAM (RRAM), or a ferroelectric RAM (FRAM).

A cache memory may support an access speed higher than a main memory. As a portion of data stored in the main memory is stored in the cache memory, a speed at which an access according to a request of a processor is made may be improved.

SUMMARY

Embodiments of the present disclosure provide an electronic device capable of minimizing power consumption with improved stability, a system-on-chip, and an operating method thereof.

According to an embodiment of the present invention, an electronic device includes a cache memory including a memory space for storing a first cache set including a plurality of sector data and a plurality of dirty bits, each of the plurality of dirty bits representing whether corresponding sector data of the plurality of sector data are modified, a memory controller, connected to a plurality of data lines and a data mask line, for receiving the plurality of sector data and the plurality of dirty bits from the cache memory, setting a logic level of a data mask signal based on a logic level of each of the plurality of dirty bits, and outputting the plurality of sector data through the plurality of data lines and the data mask signal through the data mask line, and a memory device, connected to the plurality of data lines and the data mask line, for receiving the plurality of sector data through the plurality of data lines, and receiving the data mask signal through the data mask line.

According to an embodiment of the present invention, an operating method of an electronic device which includes a cache memory including a memory space for storing a first cache set including a plurality of sector data and a plurality of dirty bits, each of the plurality of dirty bits representing whether corresponding sector data of the plurality of sector data stored in the cache memory are modified, a memory device, and a memory controller between the cache memory and the memory device, includes setting, by the memory controller, a logic level of the data mask signal based on a logic level of each of the plurality of dirty bits, issuing, by the memory controller, a first mask write (MWR) command to the memory device through command/address (CA) lines connected thereto, and transmitting, by the memory controller, the plurality of sector data stored in the cache memory to the memory device through a plurality of data lines connected thereto, and a data mask signal to the memory device through a data mask line connected thereto.

According to an embodiment of the present invention, a solid state drive (SSD) controller includes a cache memory including a memory storage for storing a first cache set including first sector data and second sector data, and a first dirty bit and a second dirty bit which are associated with the first sector data and the second sector data, respectively, and a buffer memory interface circuit for flushing, based on a logic level of each of the first and second dirty bits, the first and second sector data to an external memory device. The buffer memory interface circuit includes a data mask control circuit which generates a data mask signal and outputs the data mask signal to the external memory device. The data mask control circuit sets a logic level of data mask signal based on the logic level of each of the first dirty bit and the second dirty bit. The logic level of each of the first dirty bit and second dirty bit represents that a corresponding one of the first sector data and the second sector data is in one of a dirty state and a clean state.

According to an embodiment of the present invention, a memory device includes a memory cell array including a plurality of memory cells, an input/output circuit for receiving a plurality of sector data through a plurality of data lines, and a control logic circuit for receiving a first mask write (MWR) command through command/address (CA) lines, receiving a data mask signal through a data mask line, and selectively storing the plurality of sector data in the memory cell array in response to the data mask signal. The data mask signal is generated from an external memory controller based on a plurality of dirty bits associated with the plurality of sector data, respectively.

According to an embodiment of the present invention, a cache memory system includes a cache memory including a memory space configured to store a first cache set including a plurality of sector data and a plurality of dirty bits, each of the plurality of dirty bits representing whether corresponding sector data of the plurality of sector data are modified, and a processor configured to perform a flush operation on the first cache set so that the plurality of sector data and the plurality of dirty bits are outputted to an external memory controller. The size of the first cache set is the same as the size of a cache line which is a minimum access unit of data in the flush operation.

According to an embodiment of the present invention, a memory controller includes a data mask control circuit. The data mask control circuit receives a plurality of sector data and a plurality of dirty bits from an external cache memory, each of the plurality of dirty bits representing whether corresponding sector data of the plurality of sector data are modified, generates a data mask signal based on the plurality of dirty bits, outputs the plurality of sector data to an external memory device through a plurality of data lines, and outputs the data mask signal to the external memory device through a data mask line.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the present disclosure.

Figure 1:
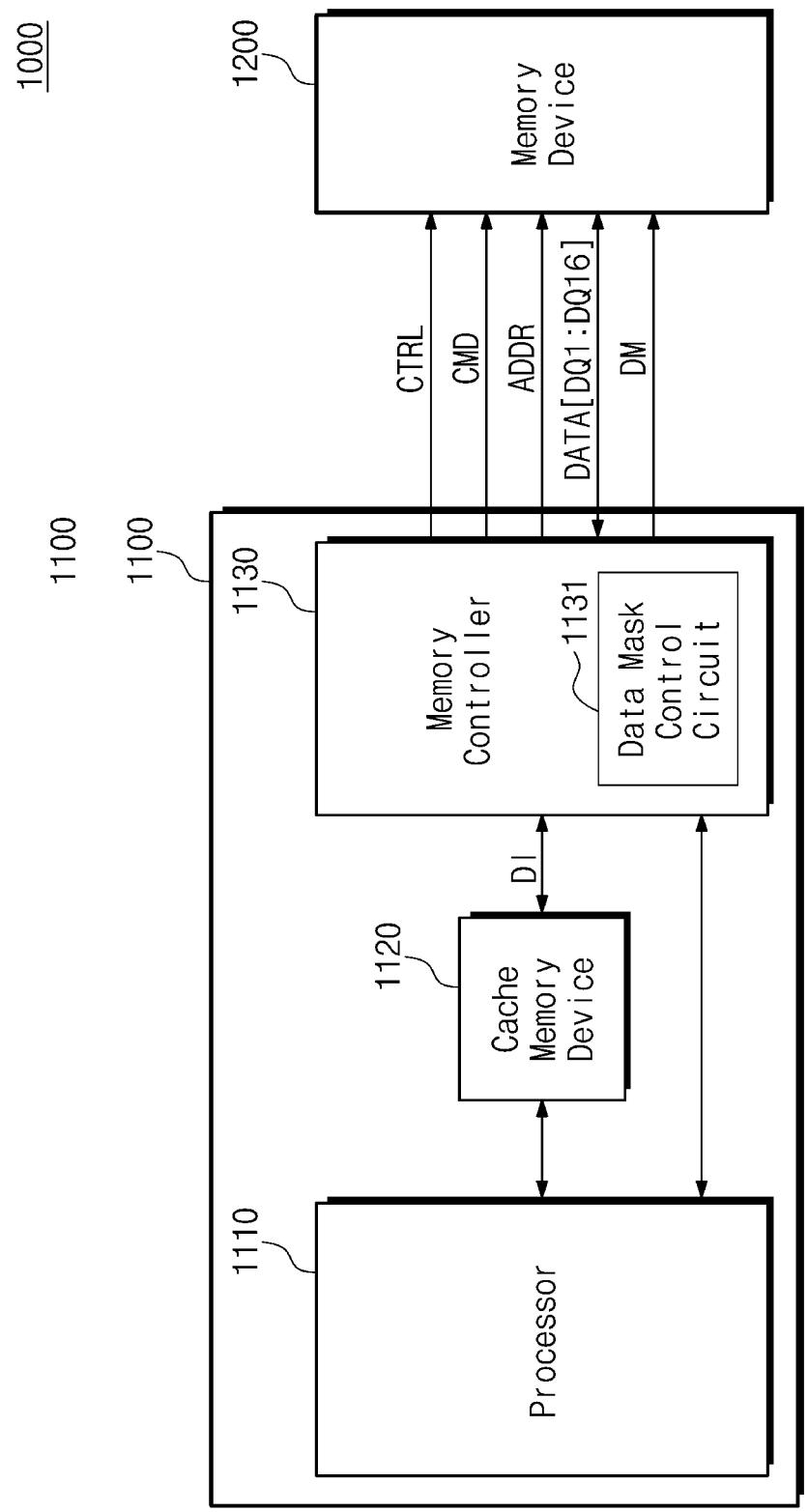
FIG. 1 is a block diagram illustrating an electronic device according to an embodiment of the present disclosure.

FIG. 1 is a block diagram illustrating an electronic device according to an embodiment of the present disclosure. Referring to FIG. 1, an electronic device 1000 may include a system-on-chip (SoC) 1100 and a memory device 1200. In an embodiment, the electronic device 1000 may be one of various computing devices such as a desktop computer, a laptop computer, a workstation, a server, a smartphone, a tablet PC, a digital camera, and a black box.

The SoC 1100 may control overall operations of the electronic device 1000. For example, the SoC 1100 may be an application processor (AP) which controls the overall operations of the electronic device 1000. The SoC 1100 may run an operating system, a program, or an application that is executable on the electronic device 1000.

The SoC 1100 may store data in the memory device 1200 or may read data stored in the memory device 1200. The SoC 1100 may include a processor 1110, a cache memory device 1120 (i.e., a cache memory), and a memory controller 1130. The processor 1110 may perform various operations of the electronic device 1000 and may process data.

In response to a signal received from the processor 1110, the cache memory device 1120 may store data or may provide data stored therein to the processor 1110. The cache memory device 1120 may support an access speed higher than the memory device 1200. For example, as a portion of data stored in the memory device 1200 is stored in the cache memory device 1120, a speed at which an access according to a request of the processor 1110 is made may be improved. In an embodiment, the cache memory device 1120 may be a static random access memory (SRAM) device, but the present disclosure is not limited thereto.

In an embodiment, the cache memory device 1120 may generate dirty information DI. The cache memory device 1120 may transmit the dirty information DI and data to the memory controller 1130. The dirty information DI may indicate whether cache data loaded from the memory device 1200 are updated.

The memory controller 1130 may control the memory device 1200. For example, the memory controller 1130 may transmit an address ADDR, a command CMD, a control signal CTRL, and a data mask signal DM to the memory device 1200 for the purpose of controlling the memory device 1200 and may exchange data "DATA" with the memory device 1200 through a data line DQ.

The memory device 1200 may operate under control of the memory controller 1130. For example, in response to signals received from the memory controller 1130, the memory device 1200 may store the data "DATA" or may provide the stored data "DATA" to the memory controller 1130. In an embodiment, the memory device 1200 may be a dynamic random access memory (DRAM) device, but the present disclosure is not limited thereto.

In an embodiment, the memory controller 1130 and the memory device 1200 may communicate with each other based on a given interface. The given interface may be a low-power double data rate (LPDDR), but the present disclosure is not limited thereto. For example, the given interface may include at least one of various interfaces such as a DDR interface, a universal serial bus (USB) interface, a multimedia card (MMC) interface, a peripheral component interconnection (PCI) interface, a PCI-express (PCIe) interface, an advanced technology attachment (ATA) interface, a serial-ATA (SATA) interface, a parallel-ATA (PATA) interface, a small computer small interface (SCSI) interface, an enhanced small disk interface (ESDI), an integrated drive electronics (IDE) interface, a mobile industry processor interface (MIPI), and a nonvolatile memory-express (NVMe) interface.

In an embodiment, the memory controller 1130 may include a data mask control circuit 1131. The data mask control circuit 1131 may receive the dirty information DI from the cache memory device 1120. The data mask control circuit 1131 may output the data mask signal DM through a data mask line based on the received dirty information DI.

When the processor 1110 transmits a write request, write-requested data may be temporarily stored in the cache memory device 1120 without being immediately transmitted to the memory device 1200. After data are stored in the cache memory device 1120 without writing the data to the memory device 1200, a write complete signal may be transmitted to the processor 1110. This write operation is called a "write operation of a write-back manner". In contrast, when the processor 1110 transmits a write request, write-requested data may be stored in the cache memory device 1120 and may be immediately transmitted to the memory device 1200. A write complete signal may be transmitted to the processor 1110 after the data are stored in the memory device 1200. This write operation is called a "write operation of a write-through manner".

When a write operation is performed in the write-back manner, a line fill operation (i.e., a cache fill operation) from the memory device 1200 to the cache memory device 1120 may be performed, and data damage may occur in the line fill operation. The line fill operation may indicate the following operation: when a cache miss occurs in the cache memory device 1120, data corresponding to the cache miss are read from the memory device 1200, and the read data are stored in the cache memory device 1120. When there is an error on an interface (e.g., a communication between the memory device 1200 and the cache memory device 1120) or the cache memory device 1120 during the line fill operation, damaged data may be stored in the cache memory device 1120. Also, when a flush operation is performed on a cache line where the damaged data are stored, the damaged data may be stored in the memory device 1200.

In an embodiment, a cache line may be a minimum access unit of a read or write request that the processor 1110 transmits to the memory device 1200. A size of each of cache lines may be, for example, 32 Bytes or 64 Bytes, but the present disclosure is not limited thereto.

A conventional electronic device accesses a memory device in units of cache line and manages dirty information in units of cache line. The conventional electronic device may perform the line fill operation or the flush operation on all the cache lines. In this case, when a portion of data included in a cache line is damaged, the damaged portion may be stored in the memory device.

In contrast, the electronic device 1000 according to an embodiment of the present disclosure may manage dirty information in units of sector smaller than a cache line. The electronic device 1000 may generate the data mask signal DM based on dirty information managed in units of sector and may perform a write operation on the memory device 1200 in units of sector. Accordingly, a sector in the cache memory device 1120, which is not updated by the processor 1110, may not be stored in the memory device 1200 for data consistency between the cache memory device 1120 and the memory device 1200. According to the above description, unnecessary data store operations may be minimized, and thus, an error in the memory device 1200 may decrease. An operation of the electronic device 1000 according to the present disclosure will be described with reference to the following drawings.

Figure 2:
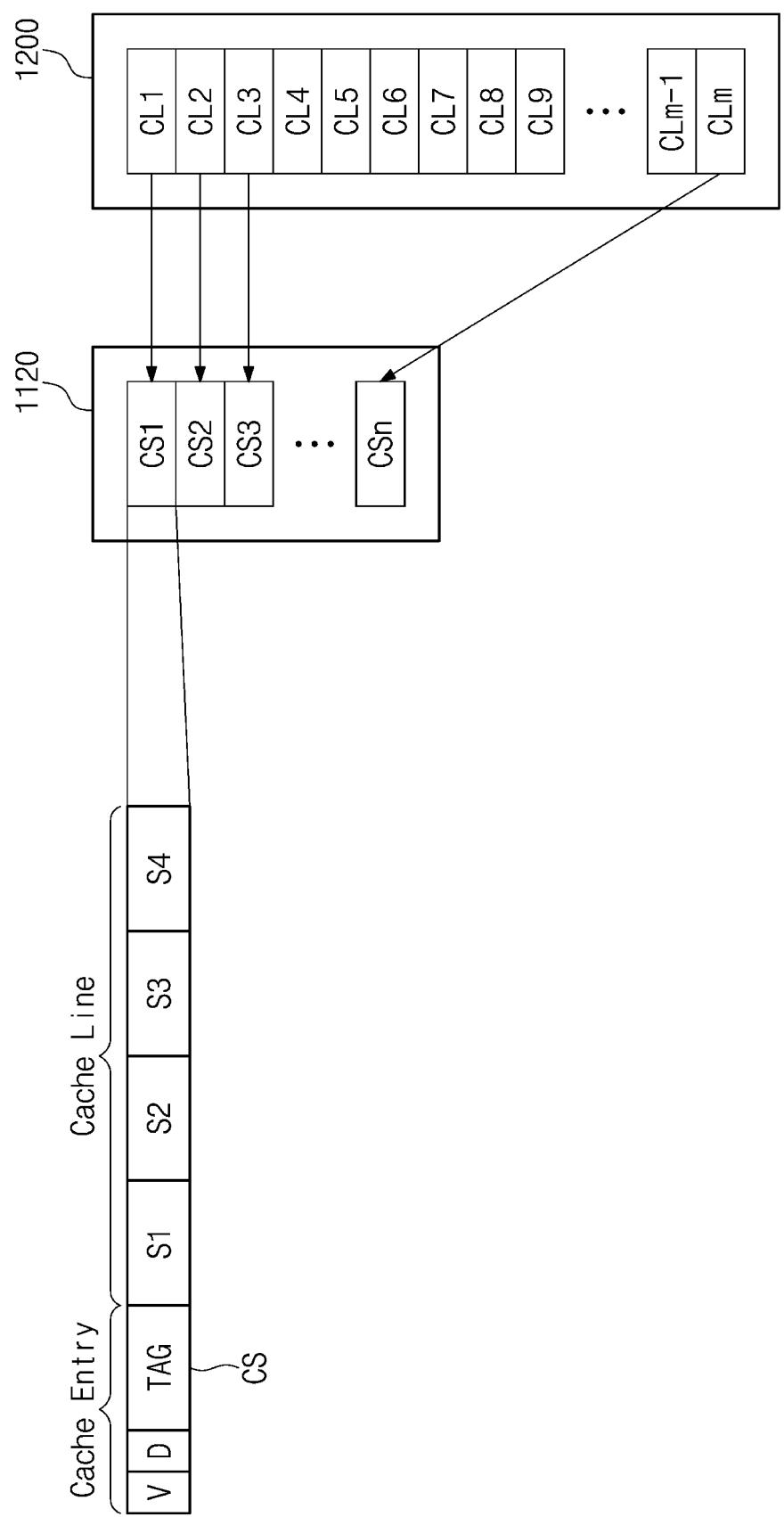
FIG. 2 is a diagram for describing a cache structure of an electronic device of FIG. 1.

FIG. 2 is a diagram for describing a cache structure of an electronic device of FIG. 1. For convenience of description, components that are unnecessary to describe a cache structure of the cache memory device 1120 will be omitted.

The cache memory device 1120 may include a plurality of cache sets CS1 to CSn. A cache set CS may include a cache line and a cache entry. The cache entry may include a valid bit "V", a dirty bit "D", and a tag TAG. In an embodiment, the format of the cache set CS includes a field for storing data of the cache line, and a field for storing information of the cache entry.

The memory device 1200 may include a plurality of cache lines CL1 to CLm. The plurality of cache lines CL1 to CLm may indicate a storage space corresponding to a unit of a data access according to a request of the processor 1110.

A portion of data stored in the memory device 1200 may be stored in the cache memory device 1120. In an embodiment, the first cache line CL1 may correspond to the first cache set CS1, the second cache line CL2 may correspond to the second cache set CS2, the third cache line CL3 may correspond to the third cache set CS3, and the m-th cache line CLm may correspond to the n-th cache set CSn.

A cache line may include first to fourth sectors S1 to S4. The first to fourth sectors S1 to S4 may have the same size. For example, when a size of a cache line is 64 Bytes, a size of a sector may be 16 Bytes.

The tag TAG may indicate address information about cache data stored in each cache set. In an embodiment, the tag TAG may be information indicating a cache line corresponding to cache data from among the cache lines CL1 to CLm of the memory device 1200. The tag TAG may be used to determine whether data corresponding to an address received from the processor 1110 are present in the cache memory device 1120. The tag TAG may be used to determine a cache hit or a cache miss. A cache hit may indicate the case where data corresponding to an address received from the processor 1110 are present in the cache memory device 1120. A cache miss may indicate the case where data corresponding to an address received from the processor 1110 are absent from the cache memory device 1120.

The dirty bit "D" may indicate whether after cache data are stored in a corresponding cache set, the cached data is updated. The dirty bit "D" may indicate whether cache data are identical to the corresponding data stored in the memory device 1200. In the case where no update is made, the dirty bit "D" may be maintained to indicate a clean state. In the case where the update is made, the dirty bit "D" may be set to indicate a dirty state.

In an embodiment, the dirty bit "D" may have one of a first logical value and a second logical value. The first logical value of the dirty bit "D" indicates that cached data associated with the dirty bit "D" and the corresponding data stored in the memory device 1200 are identical with each other. The second logical the dirty bit "D" indicates that cached data associated with the dirty bit "D" are updated, and the cached data and the corresponding data stored in the memory device 1200 are different from each other.

The valid bit "V" may indicate whether valid data are loaded from the memory device 1200 to the corresponding cache set. The valid bit "V" may represent one of a first logical value and a second logical value. The second logical value of the valid bit "V" indicates an activated state in which valid data have been loaded from the memory device 1200 to the corresponding cache set of the cache memory device 1120, and the first logical value of the valid bit "V" indicates an deactivated state in which no valid data have not been loaded from the memory device 1200 to the corresponding cache set of the cache memory device 1120. In an embodiment, when the SoC 1100 is booted, the valid bit "V" may be initialized to the first logical value, and upon uploading of valid data from the memory device 1200 to the cache memory device 1120, the valid bit "V" changes to have the second logical value. In an embodiment where the processor 1110 includes multi-processor cores, the valid bit "V" may be reset to the first logical value while in use.

Each of the plurality of cache lines CL1 to CLm may be selected or recognized by an address provided from the processor 1110. For example, at least one cache line of the plurality of cache lines CL1 to CLm may be selected by an address provided from the processor 1110, and an access operation may be performed on the selected cache line.

Each of the plurality of cache sets CS1 to CSn may be selected or recognized by at least a portion (e.g., a partial address) of the address provided from the processor 1110. At least one cache set of the plurality of cache sets CS1 to CSn may be selected by at least a portion of the address provided from the processor 1110, and an access operation may be performed on the selected cache set.

The tag TAG may include at least a portion of the address provided from the processor 1110 or the remaining portion thereof. For example, the case where at least one of the plurality of cache sets CS1 to CSn is selected by the address or by at least a portion of the address and the address is included in the tag TAG of the selected cache set may be determined as a cache hit. Alternatively, the case where at least one of the plurality of cache sets CS1 to CSn is selected by at least a portion of the address and the address is not included in the tag TAG of the selected cache set may be determined as a cache miss.

Figure 3A:
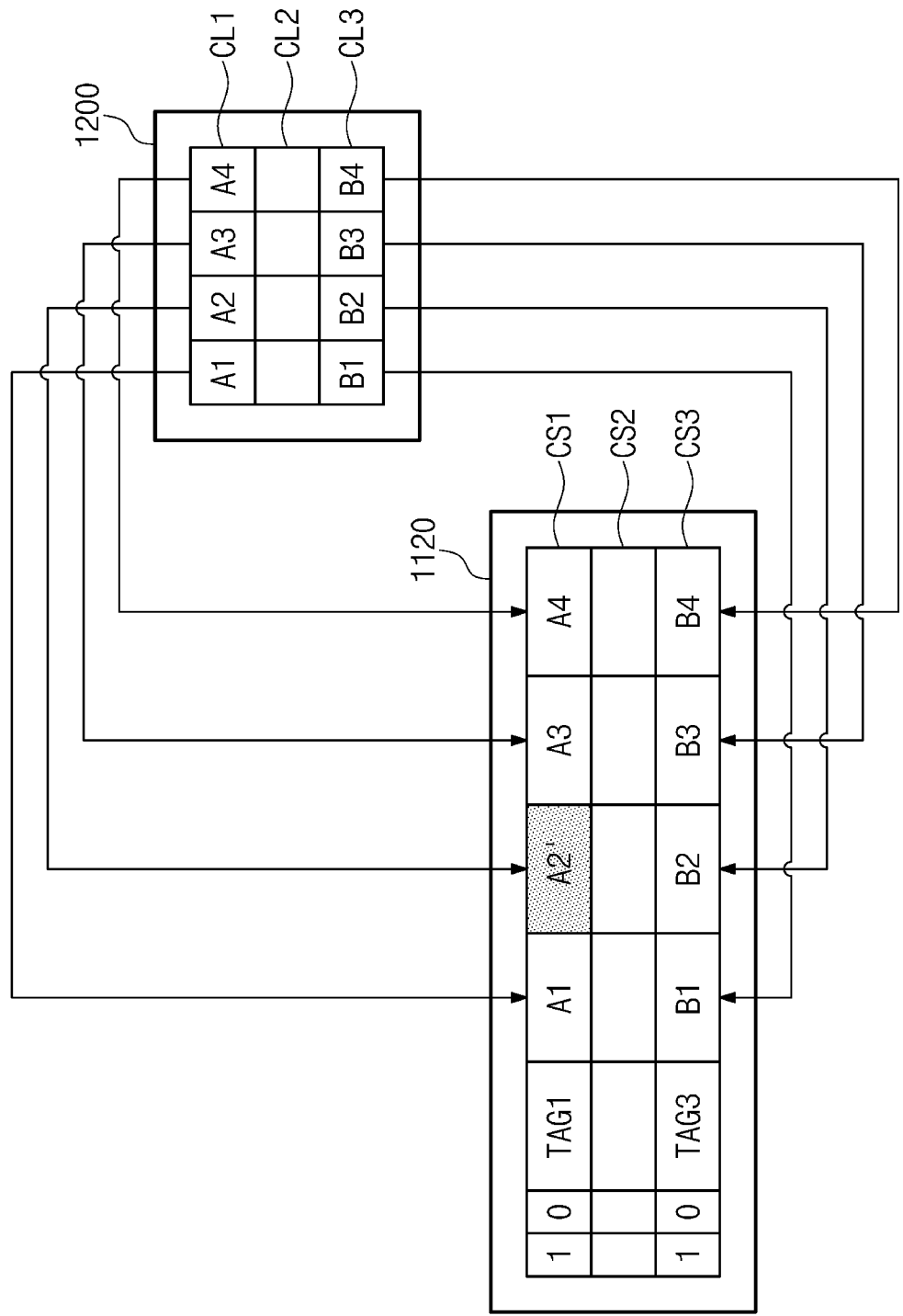
FIGS. 3A to 3C are diagrams illustrating an operation of an electronic device.
Figure 3B:
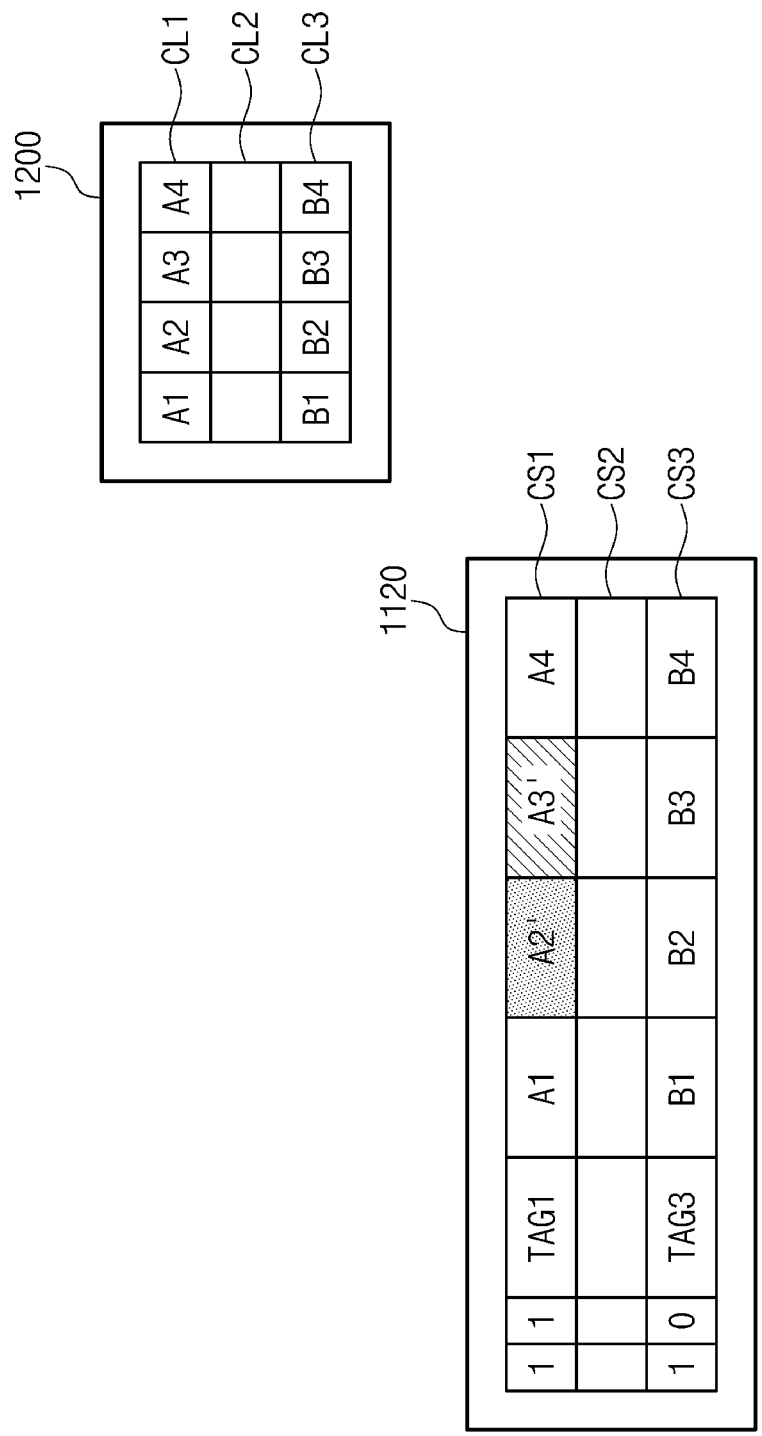
Figure 3C:
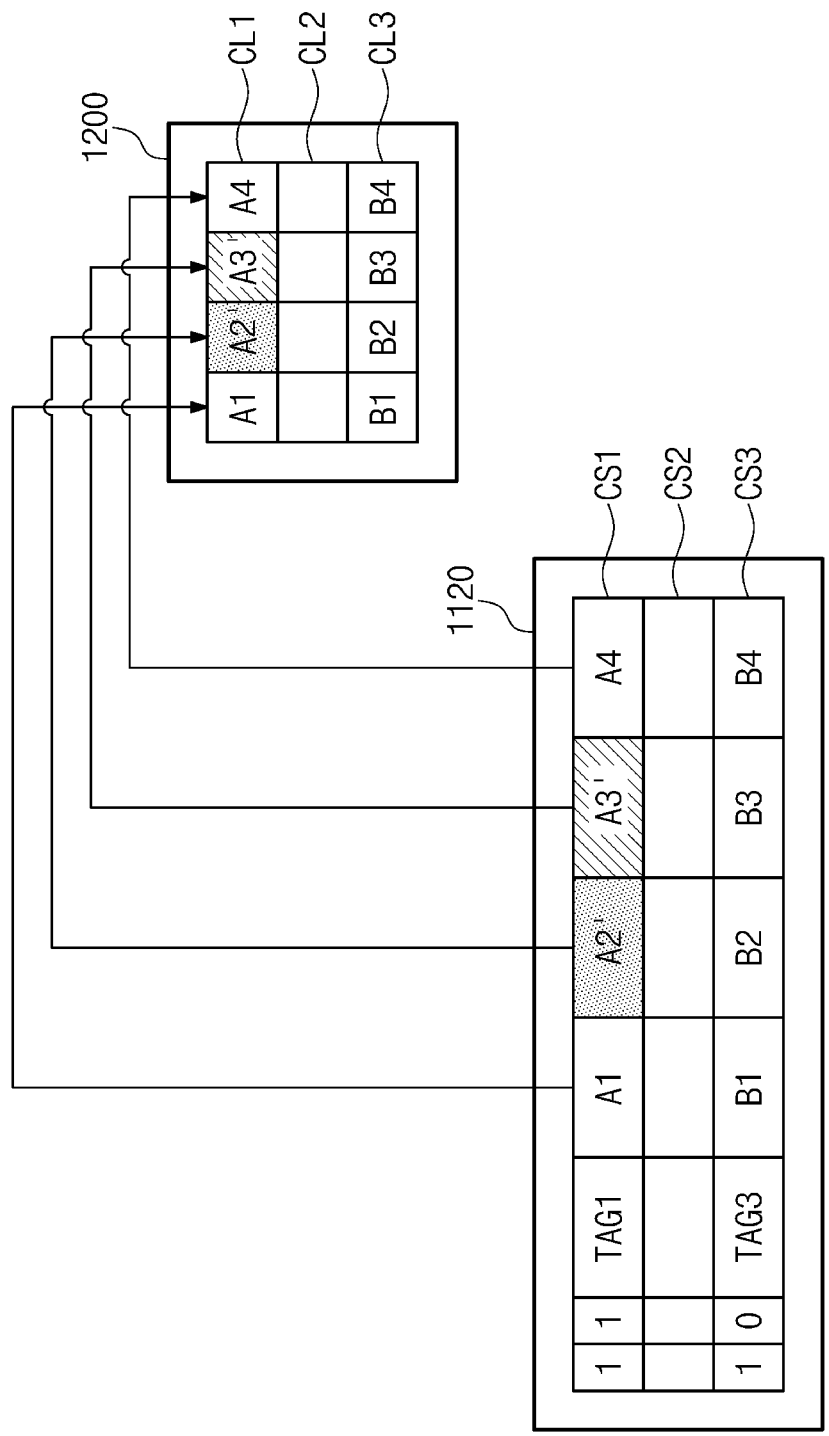

FIGS. 3A to 3C are diagrams illustrating an operation of an electronic device. For brevity of drawing and convenience of description, it is assumed that the cache memory device 1120 includes first to third cache storage spaces for storing the first to third cache sets CS1 to CS3, respectively, and the memory device 1200 includes first to third memory storage spaces for storing the first to third cache lines CL1 to CL3. Hereinafter, the cache sets CS1 to CS3 refer to the cache storage spaces of the cache memory device 1120, unless otherwise described, the cache lines CL1 to CL3 refer to the memory storage spaces of the memory device 1200, unless otherwise described. Also, it is assumed that the first cache line CL1 corresponds to the first cache set CS1, the second cache line CL2 corresponds to the second cache set CS2, and the third cache line CL3 corresponds to the third cache set CS3. For example, the first cache set CS1 may be associated with the first cache line CL1 to store data thereof, the second cache set CS2 may be associated with the second cache line CL2 to store data thereof, and the third cache set CS3 may be associated with the third cache line CL3 to store data thereof. It is assumed that sector data A1, A2, A3, and A4 are stored in the first cache line CL1 and sector data B1, B2, B3, and B4 are stored in the third cache line CL3. However, the present disclosure is not limited thereto.

Referring to FIGS. 1, 2, and 3A, the processor 1110 may perform the line fill operation such that data in the third cache line CL3 of the memory device 1200 are stored in the third cache set CS3 of the cache memory device 1120. In an embodiment, the plurality of sector data B1, B2, B3, and B4 of the third cache line CL3 may be stored in the third cache set CS3. The line fill operation from the third cache line CL3 to the third cache set CS3 is performed on third cache set CS3 with the valid bit "V" of the first logical value indicating the deactivated state. After the line fill operation, the valid bit "V" of the third cache set CS3 may change to the second logical value indicating the activated state, and the dirty bit "D" of the third cache set CS3 may be set to the first logical value. The third tag TAG3 of the third cache set CS3 may store address information of the third cache line CL3. For example, the third tag TAG3 of the third cache set CS3 may store address information of the third cache line CL3, which corresponds to the memory address of the third cache line CL3 where the plurality of sector data B1, B2, B3, and B4 are stored in the memory device 1200. In an embodiment, the address information of the third cache line CL3 stored in the third tag TAG3 of the third cache set CS3 may be part of the memory address of the third cache line CL3, which may be a block address of the plurality of sector data B1, B2, B3, and B4.

However, in the line fill operation from the memory device 1200 to the cache memory device 1120, an interface error may occur to data which are transmitted from the memory device 1200 to the cache memory device 1120, or a cache memory error may occur while data are stored in the cache memory device 1120.

In an embodiment, the processor 1110 may perform the line fill operation such that data in the first cache line CL1 of the memory device 1200 are stored in the first cache set CS1 of the cache memory device 1120. After the line fill operation, the first cache set CS1 may store a plurality of sector data A1, A2', A3, and A4 in which the sector data A2' are assumed to be damaged due to such interface or cache memory error, and the sector data A1, A2', A3, and A4 stored in the first cache set CS1 of the cache memory device 1120 are different from the sector data A1, A2, A3, and A4 stored in the cache line of the memory device 1200. For brevity of description, it is assumed that the second sector data A2 of the first cache line CL1 may be damaged due to the interface or cache memory error, and may be stored as the second damaged sector data A2'. In an embodiment, the line fill operation from the first cache line CL1 to the first cache set CS1 is performed on the first cache set CS1 with the valid bit "V" of the first logical value indicating the deactivated state. After the line fill operation, the valid bit "V" of the first cache set CS1 may change to the second logical value indicating the activated state, and the dirty bit "D" of the first cache set CS1 may be set to the first logical value. The first tag TAG1 of the first cache set CS1 may store address information of the first cache line CL1. For example, the first tag TAG1 of the first cache set CS1 may store address information of the first cache line CL3, which corresponds to the memory address of the first cache line CL1 where the plurality of sector data A1, A2, A3, and A4 are stored in the memory device 1200. In an embodiment, the address information of the first cache line CL1 stored in the first tag TAG1 of the first cache set CS1 may be part of the memory address of the first cache line CL1, which may be a block address of the plurality of sector data A1, A2, A3, and A4.

Referring to FIG. 3B, the processor 1110 may perform a write operation of the write-back manner. The processor 1110 may transmit a write request for a first address ADDR1 indicating the third sector S3 of the first cache line CL1 to the cache memory device 1120. In an embodiment, the processor 1110 may transmit the write request including the first address ADDR1 and sector data A3' to the cache memory device 1120.

The cache memory device 1120 may compare the first address ADDR1 and the first tag TAG1 and may determine whether data corresponding to the first address ADDR1 are stored in the first cache set CS1. When the first tag TAG1 indicates a memory address of the first cache line CL1, the cache memory device 1120 may determine that a cache hit occurs. The cache memory device 1120 may store the sector data A3' in the third sector S3 of the first cache set CS1 of the cache memory device 1120.

In response to the determination of the cache hit, the cache memory device 1120 may set the dirty bit "D" of the first cache set CS1 to the second logical value. The sector data A3 stored in the first cache set CS1 are updated after the line fill operation from the memory device 1200 to the cache memory device 1120, and the dirty bit "D" of the first cache set CS1 may be set to the second logical value which indicates that the cached data stored therein is in a dirty state.

Referring to FIG. 3C, when a flush request for a second address ADDR2 indicating the first cache line CL1 is received from the processor 1110 or when it is determined through an internal operation of the cache memory device 1120 that a flush operation is required, the cache memory device 1120 may perform the flush operation on the first cache set CS1. For example, a flush operation may be performed to write cached data of the first cache set CS1 to the memory device 1200. After the write operation of the write-back manner is performed, the cached data of the first cache set CS1 may be different from the data stored in the first cache line CL1, accessed with the second address ADDR2, of the memory device 1200. The flush operation may be performed to update the data stored in the first cache line CL1 of the memory device 1200 with the cached data of the first cache set CS1. The flush operation may be triggered in response to a flush request of the processor 1110 which determines that an application program running on the processor 1110 demands the data stored in the second address ADDR2 of the first cache line CL1 or which is informed from another processor (or another master other than the processor 1110) that it will access the first cache line CL1 to retrieve the data stored therein, for example. Since the data stored in the first cache set CS1 of the cache memory 1120, associated with the first cache line CL1 of the memory device 1200, is updated in the previous write operation of the write-back manner, the data of the first cache line CL1 needs update using the cached data stored in the first cache set CS1 before the application program or another processor access to the first cache line CL1 accessed using the second address ADDR2. In an embodiment, the flush operation may be triggered according to an internal operation of the cache memory device 1120 based on a cache management algorithm. In an embodiment, because the number of cache sets of the cache memory device 1120 is limited, the flush operation may be periodically or in response to a cache miss, performed for a new cache line fill operation.

The cache memory device 1120 may select a victim cache set among a plurality of cache sets for the purpose of performing the flush operation. In an embodiment, assuming that the first cache set CS1 is selected as a victim cache set, the cache memory device 1120 may determine whether the first cache set CS1 is in the dirty state or the clean state. Because the dirty bit "D" of the first cache set CS1 has the second logical value, the cache memory device 1120 may determine that the first cache set CS1 is in a dirty state. In an embodiment, the cache memory device 1120 may select the first cache set CS1 as a victim cache set among a plurality of cache sets, and the flush operation is performed on the first cache set CS1. For example, when the address information stored in the first TAG1 of the first cache set CS1 is matched with the second address ADDR2 of the flush request, the flush request for the second address ADDR2 is issued to the cache memory device 1120.

The cache memory device 1120 may perform the flush operation on the first cache set CS1. The cache memory device 1120 may transmit a write request for the second address ADDR2 indicated by the first tag TAG1 and a plurality of sector data A1, A2', A3', and A4 stored in the first cache set CS1 to the memory device 1200.

In response to the write request of the flush operation, the memory device 1200 may store the plurality of sector data A1, A2', A3', and A4 in the first cache line CL1 that the second address ADDR2 indicates. The second damaged sector data A2' may be stored in the first cache line CL1. Under the condition that only the third sector S3 of the first cache set CS1 is updated and the second sector S2 of the first cache set CS1 is not updated, in the case where all the sector data A1, A2', A3', and A4 stored in the first cache set CS1 are again stored in the memory device 1200, damaged data may be stored in the memory device 1200. This may cause a system error.

Figure 4:
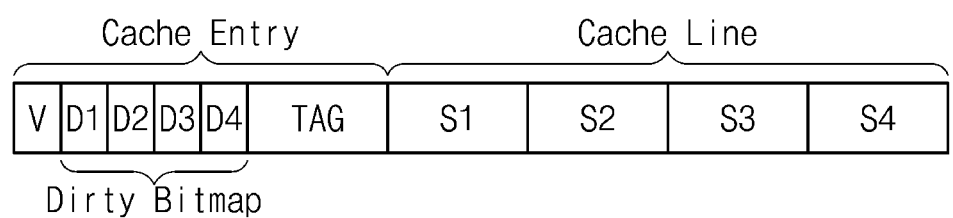
FIG. 4 is a diagram for describing a cache set according to an embodiment of the present disclosure.

FIG. 4 is a diagram for describing a cache set according to an embodiment of the present disclosure. Referring to FIGS. 2 and 4, a cache set may include a cache line and a cache entry. The cache entry may include a valid bit "V", a dirty bit map (D1, D2, D3, D4), and a tag TAG. A cache line may include N sectors (N being a positive number), and the dirty bit map may include N dirty bits corresponding to the N sectors, respectively. For brevity of drawing and convenience of description, it is assumed that a dirty bit map includes first to fourth dirty bits D1 to D4 and a cache line includes first to fourth sectors S1 to S4. However, the present disclosure is not limited thereto.

The first to fourth dirty bits D1 to D4 may correspond to the first to fourth sectors S1 to S4, respectively. For example, the first dirty bit D1 may indicate dirty information about the first sector S1, the second dirty bit D2 may indicate dirty information about the second sector S2, the third dirty bit D3 may indicate dirty information about the third sector S3, and the fourth dirty bit D4 may indicate dirty information about the fourth sector S4. The tag TAG, the valid bit "V", and the first to fourth sectors S1 to S4 are described with reference to FIG. 2, and thus, additional description will be omitted to avoid redundancy.

Figure 5A:
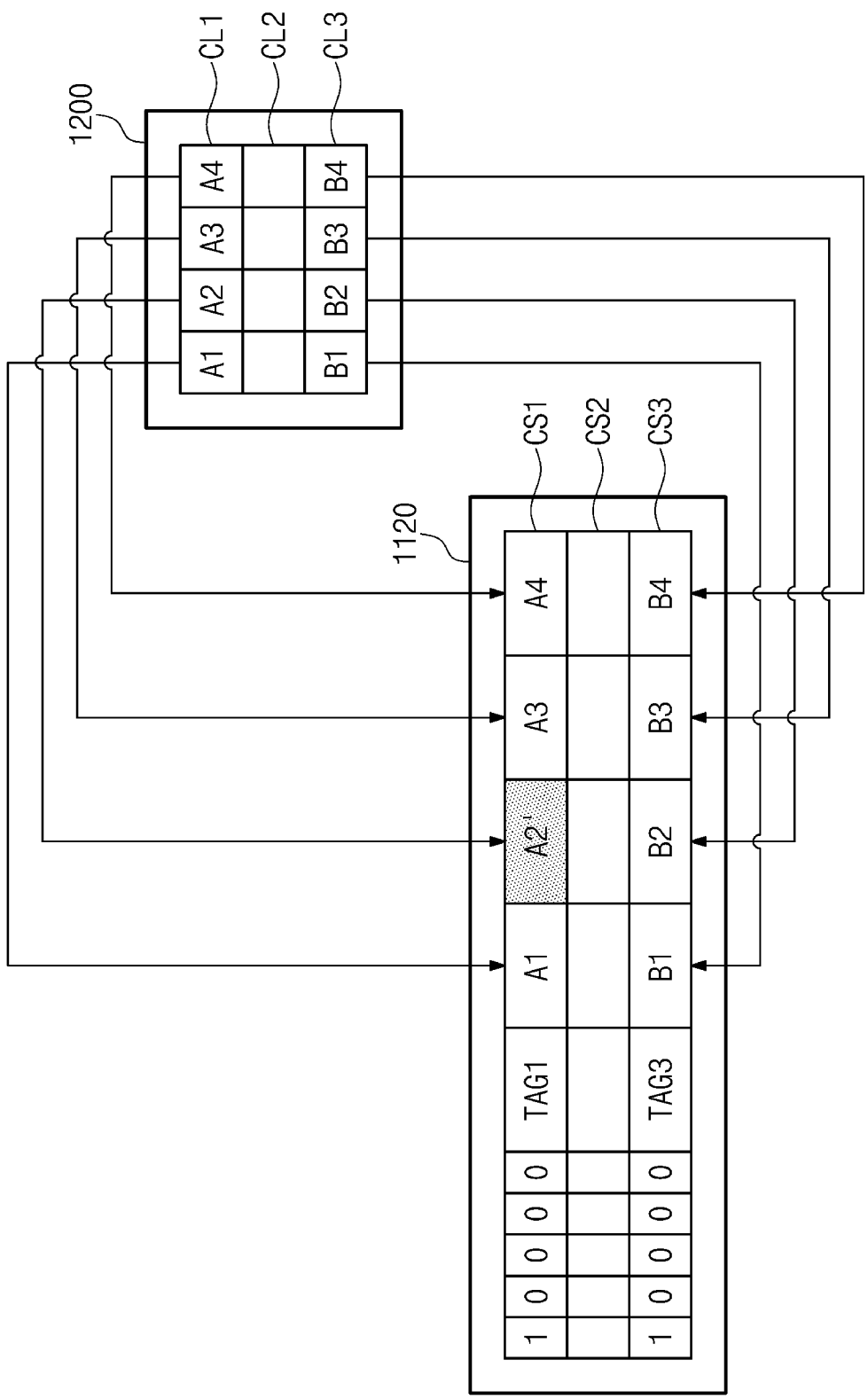
FIGS. 5A to 5C are diagrams illustrating an operation of an electronic device of FIG. 1.
Figure 5B:
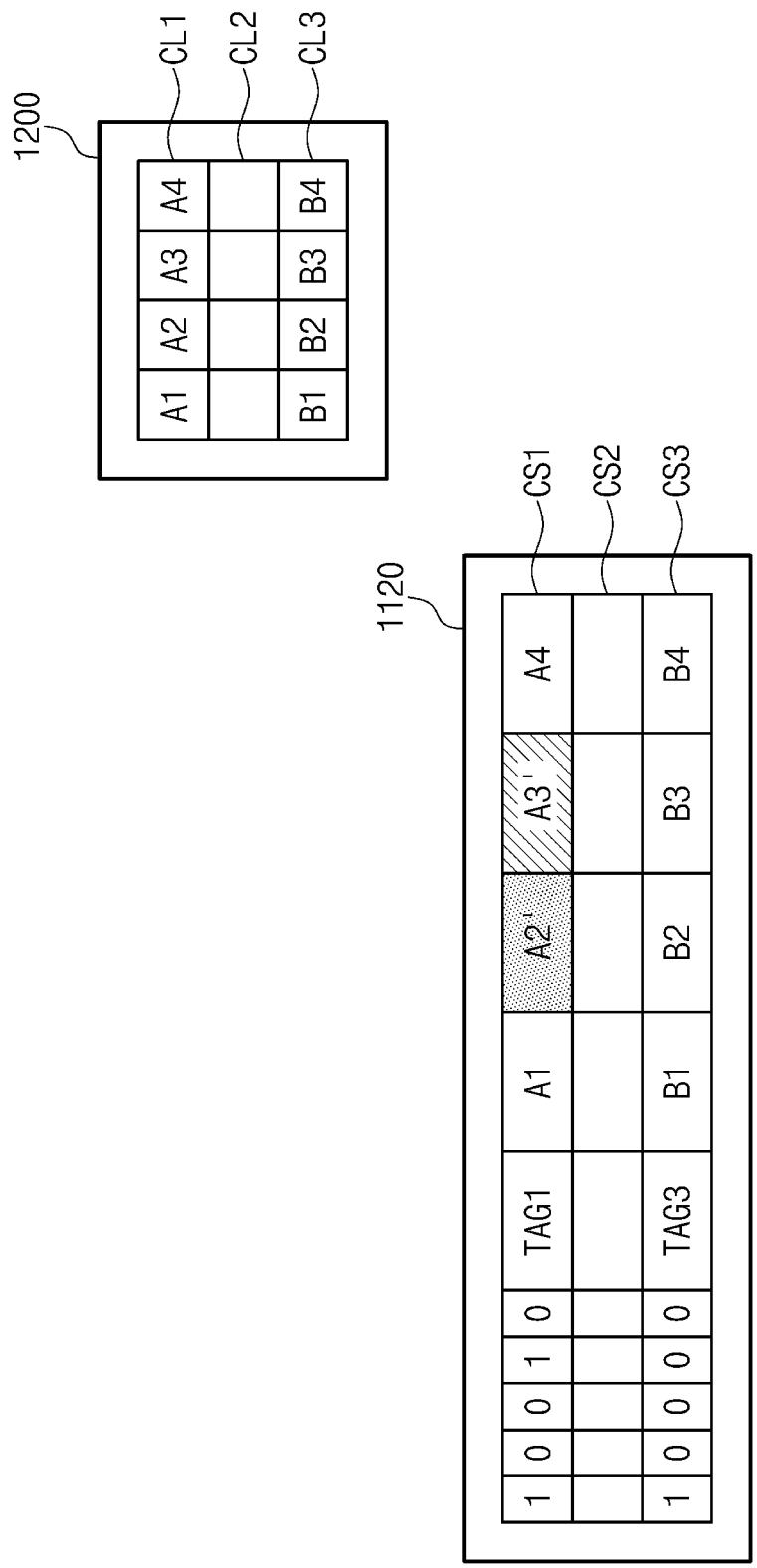
Figure 5C:
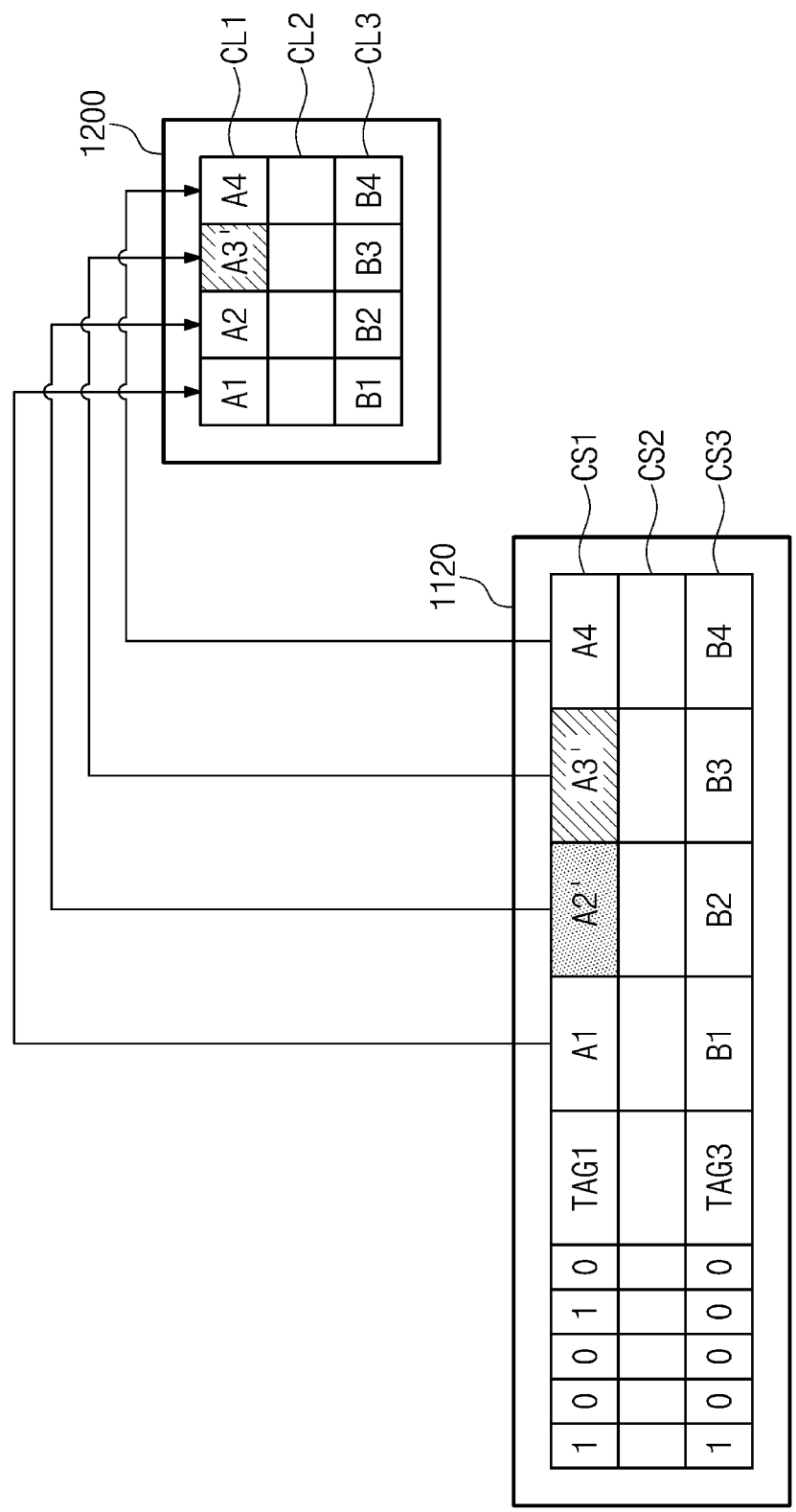

FIGS. 5A to 5C are diagrams illustrating an operation of an electronic device of FIG. 1. For brevity of drawing and convenience of description, it is assumed that the cache memory device 1120 includes the first to third cache sets CS1 to CS3, and the memory device 1200 includes the first to third cache lines CL1 to CL3. For the sake of description, it is assumed that the first cache line CL1 corresponds to the first cache set CS1, the second cache line CL2 corresponds to the second cache set CS2, and the third cache line CL3 corresponds to the third cache set CS3. It is assumed that the sector data A1, A2, A3, and A4 are stored in the first cache line CL1, and the sector data B1, B2, B3, and B4 are stored in the third cache line CL3. However, the present disclosure is not limited thereto.

The processor 1110 may perform the line fill operation on the third cache line CL3. The line fill operation associated with the third cache line CL3 is described with reference to FIG. 3A, and thus, additional description will be omitted to avoid redundancy. However, because dirty information is managed in units of sector, each of the first to fourth dirty bits D1 to D4 of the third cache set CS3 may be initialized to the first logical value, and, depending on whether cached data associated with each of the first to fourth dirty bits D1 to D4 are updated, may change to the second logical value.

In the line fill operation from the memory device 1200 to the cache memory device 1120, the cached data stored in the first to third cache sets CS1, CS2, and CS3 may have the interface or cache memory error.

In an embodiment, the processor 1110 may perform the line fill operation such that data in the first cache line CL1 of the memory device 1200 are stored in the first cache set CS1 of the cache memory device 1120. As described with reference to FIG. 3A, the plurality of sector data A1, A2', A3, and A4 may be stored in the first cache set CS1. This is described above, and thus, additional description will be omitted to avoid redundancy. However, the first to fourth dirty bits D1 to D4 of the first cache set CS1 may be initialized to the first logical value, and, depending on whether cached data associated with each of the first to fourth dirty bits D1 to D4 are updated, may change to the second logical value.

Referring to FIG. 5B, the processor 1110 may perform a write operation of the write-back manner. The processor 1110 may transmit a write request for the first address ADDR1 indicating the third sector S3 of the first cache line CL1 to the cache memory device 1120. In an embodiment, the processor 1110 may transmit the write request including the first address ADDR1 and the sector data A3' to the cache memory device 1120. The cache memory device 1120 may store the sector data A3' in the third sector S3 of the first cache set CS1.

The cache memory device 1120 may set the third dirty bit D3 of the first cache set CS1 to the second logical value. For example, the third sector S3 of the first cache set CS1 is updated after the line fill operation from the memory device 1200 to the cache memory device 1120, and the dirty bit D3 of the first cache set CS1 associated with the sector S3 of the third cache set CS1 may be set to the second logical level that indicates that the cached data stored therein is in a dirty state.

Referring to FIG. 5C, when the flush request for the second address ADDR2 indicating the first cache line CL1 is received from the processor 1110 or when it is determined through an internal operation of the cache memory device 1120 that the flush operation is required, the cache memory device 1120 may perform the flush operation on the first cache set CS1.

The cache memory device 1120 may transmit the write request for the second address ADDR2 indicated by the first tag TAG1, a plurality of sector data A1, A2', A3', and A4 stored in the first cache set CS1, and the dirty information DI to the memory controller 1130.

The dirty information DI may include the dirty bit map or the first to fourth dirty bits D1 to D4. The first to fourth dirty bits D1 to D4 of the dirty information DI may correspond to the first to fourth dirty bits D1 to D4 of the first cache set CS1, respectively. In the embodiment of FIG. 5B, the first dirty bit D1, the second dirty bit D2, and the fourth dirty bit D4 of the dirty information DI may have the first logical value indicating that their associated cached data stored in the first cache set CS1 is in the clean state, and the third dirty bit D3 of the dirty information DI may have the second logical value indicating that its associated cached data stored in the first cache set CS1 is in the dirty state.

The data mask control circuit 1131 of the memory controller 1130 may receive the dirty information DI. The memory controller 1130 may generate the data mask signal DM in response to the second address ADDR2, the plurality of sector data A1, A2', A3', and A4, and the dirty information DI. In an embodiment, because the first dirty bit D1, the second dirty bit D2, and the fourth dirty bit D4 of the dirty information DI have the first logical value indicating the clean state, the data mask signal DM corresponding to the first sector data A1, the second sector data A2', and the fourth sector data A4 may have the second logical value indicating an activated state in which sector data associated with the data mask signal DM having the second logical value are masked. Because the third dirty bit D3 of the dirty information DI has the second logical value indicating the dirty state, the data mask signal DM corresponding to the third sector data A3' may have the first logical value indicating a deactivated state in which sector data associated with the data mask signal DM having the logical value are stored in the memory device 1200. The memory controller 1130 may transmit the data mask signal DM to the memory device 1200 through the data mask line. This will be more fully described with reference to the following drawing.

In response to the write request of the flush operation, the cached data of the first cache set CS1 may be selectively stored in the memory device 1200 based on the data mask signal DM. For example, because the data mask signal DM corresponding to the first, second, and fourth sector data A1, A2', and A4 has the second logical value indicating the activated state, the first sector data A1, the second sector data A2', and the fourth sector data A4 of the cached data stored in the first cache set CS1 are not stored in the memory device 1200. For example, based on the data mask signal DM, the data stored in the memory device 1200 are not updated with the first, second, and fourth sector data A1, A2', and A4 of the cached data of the first cache set CS1 in the flush operation, or the first, second, and fourth sector data A1, A2', and A4 of the cached data stored in the first cache set CS1 may be blocked or masked in the flush operation. Masking may indicate that that cached data associated with the data mask signal DM indicating that a data masking operation is activated are not stored or written in the memory device 1200. As such, the second damaged sector data A2' of the first cache set CS1 are not stored in the memory device 1200. The data mask signal DM associated with the third sector data A3' has the first logical value indicating that a data masking operation is deactivated, the third sector data A3' of the cached data stored in the first cache set CS1 may be stored, without being masked by a data masking operation, in the memory cell array of the memory device 1200.

As described above, according to an embodiment of the present disclosure, in the electronic device 1000 performing the write operation of the write-back manner, each cache set may include storage spaces for storing a plurality of dirty bits associated with a plurality of sectors. As the electronic device 1000 manages a dirty bit in units of sector smaller than a cache line, the electronic device 1000 may determine a clean state or a dirty state for each sector. The cache memory device 1120 may transmit the dirty information DI to the memory controller 1130. The memory controller 1130 may generate the data mask signal DM based on the dirty information DI. The memory device 1200 may receive the data mask signal DM through the data mask line. In a flush operation, the memory device 1200 may selectively store cached data in the memory device 1200 based on the data mask signal DM.

In the line fill operation from the memory device 1200 to the cache memory device 1120 is performed, data may be damaged due to an interface or cache memory error, and the damaged data may be stored in the cache memory device 1120. Afterwards, when the damaged data may be flushed to the memory device 1200, the damaged data may be masked such that the interface or cache memory error of the damaged data is not propagated to the memory device 1200.

The electronic device 1000 according to an embodiment of the present disclosure may store data in the memory device 1200 in units of sector based on the dirty information DI and the data mask signal DM, and thus, some of the cache data corresponding to sector data are not updated in a cache operation, and are not stored in the memory device 1200 in a flush operation. Accordingly, the amount of current consumption in a flush operation may decrease, and power consumption of the electronic device 1000 is minimized. An improved electronic device may be provided.

Figure 6:
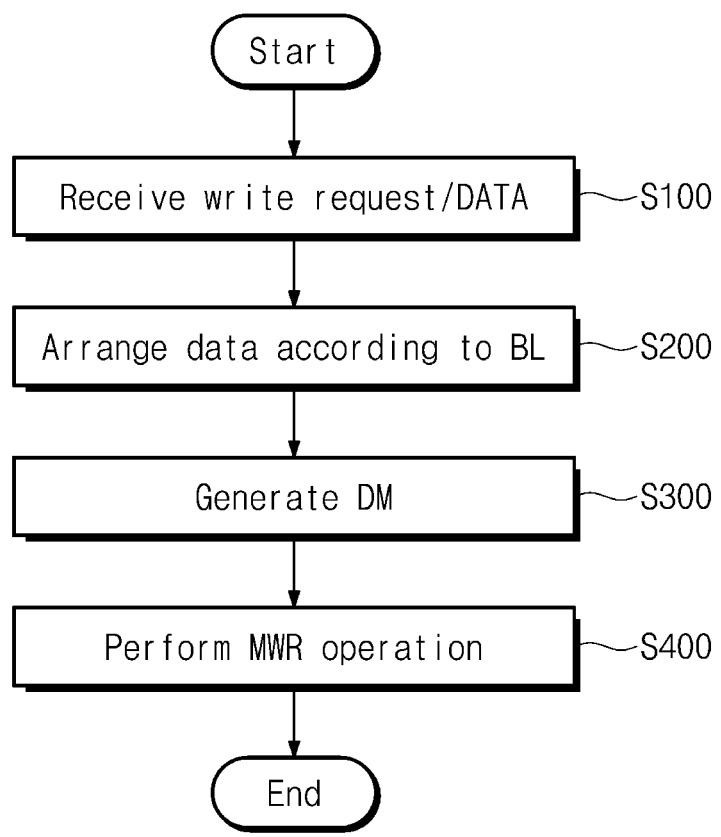
FIG. 6 is a flowchart illustrating an operation of a memory controller of FIG. 1.

FIG. 6 is a flowchart illustrating an operation of a memory controller of FIG. 1. For convenience of description, it is assumed that the memory controller 1130 exchanges data through first to sixteenth data lines DQ1 to DQ16. Also, it is assumed that the memory controller 1130 includes one data mask line for the first to sixteenth data lines DQ1 to DQ16 (see, FIG. 1). However, the present disclosure is not limited thereto.

For convenience of description, it is assumed that a size of one cache line is 64 Bytes. However, the present disclosure is not limited thereto. In an embodiment, it is assumed that a burst length BL is set to 32 (BL=32) to transmit data corresponding to a cache line through the first to sixteenth data lines DQ1 to DQ16. For example, the data corresponding to the cache line may be a cached data stored in a cache set associated with the cache line, and the data transmission from the cache memory device 1120 to the memory device 1200 may be achieved by performing a write operation with a burst length of 32, for example, on the memory device 1200.

Referring to FIGS. 5C and 6, in operation S100, the memory controller 1130 may receive a write request from the processor 1110. For example, the write request may be issued in a flush operation. In an embodiment, the memory controller 1130 may receive an address, a write request (or a write command) including the dirty information DI, and write data "DATA". The dirty information DI may include the first to fourth dirty bits D1 to D4 or the dirty bit map. The write data "DATA" may include the first to fourth sector data A1, A2', A3', and A4. In an embodiment, the write data "DATA" may correspond to cached data stored in the cache memory device.

In operation S200, the memory controller 1130 may sequentially arrange the write data "DATA" (e.g., 64 Bytes) in 32 rows, each row having 16 bits which will be outputted using the first to sixteenth data lines DQ1 to DQ16 in each burst operation. In a burst operation with the burst length BL (=32), 16 bits are outputted 32 times via the first to sixteenth data lines DQ1 to DQ16. For example, the memory controller 1130 may arrange the first sector data A1 so as to be output through the data lines DQ1 to DQ16 during first to eight burst lengths, may arrange the second sector data A2' so as to be output through the data lines DQ1 to DQ16 during ninth to sixteenth burst lengths, may arrange the third sector data A3' so as to be output through the data lines DQ1 to DQ16 during seventeenth to twenty fourth burst lengths, and may arrange the fourth sector data A4 so as to be output through the data lines DQ1 to DQ16 during twenty fifth to thirty burst lengths.

The write data "DATA" may include first to thirty-second input data Din_1 to and Din_32. In an embodiment, the write data "DATA" may include the first input data Din_1 to be transmitted to the data lines DQ1 to DQ16 during the first burst length, the second input data Din_2 to be transmitted to the data lines DQ1 to DQ16 during the second burst length, the third input data Din_3 to be transmitted to the data lines DQ1 to DQ16 during the third burst length, and the fourth input data Din_4 to be transmitted to the data lines DQ1 to DQ16 during the fourth burst length. The remaining input data Din_5 to Din_32 are similar to the input data Din_1 to Din_4 in structure, and thus, additional description will be omitted to avoid redundancy.

That is, the first sector data A1 may correspond to the first to eighth input data Din_1 to Din_8, the second sector data A2' may correspond to the ninth to sixteenth input data Din_9 to Din_16, the third sector data A3' may correspond to the seventeenth to twenty-fourth input data Din_17 to Din_24, and the fourth sector data A4 may correspond to the twenty-fifth to thirty-third input data Din_25 to Din_32.

In operation S300, the memory controller 1130 may generate the data mask signal DM based on the dirty information DI. The data mask signal DM may include the first to thirty-second data mask signals DM1 to DM32 corresponding to the burst length BL (=32) so that each burst operation may be masked using a corresponding data mask signal of the first to thirty-second data mask signals DM1 to DM32. The data mask signals DM1 to DM32 may correspond to the plurality of input data Din_1 to Din_32, respectively. For example, the first data mask signal DM1 may indicate mask information about the first input data Din_1, the second data mask signal DM2 may indicate mask information about the second input data Din_2, the third data mask signal DM3 may indicate mask information about the third input data Din_3, and the fourth data mask signal DM4 may indicate mask information about the fourth input data Din_4. The remaining data mask signals DM5 to DM32 are similar to the data mask signals DM1 to DM4 in structure, and thus, additional description will be omitted to avoid redundancy.

In an embodiment, when a dirty bit of the dirty information DI has the first logical value, because the corresponding cached data stored in the cache memory 1120 is in the clean state, the corresponding cached data are not stored in the memory device 1200. For example, the memory device 1200 may mask the corresponding cached data which is in the clean state. In response to the dirty information DI, the memory controller 1130 may set the data mask signal DM to the second logical value indicating that a data masking operation is in the activated state. When a dirty bit of the dirty information DI has the second logical value, the corresponding cached data is in the dirty state, and the corresponding cached data may be stored in the memory device 1200. The memory controller 1130 may set the data mask signal DM to the first logical value indicating that a data masking operation is in the deactivated state. A method of generating a data mask signal will be more fully described with reference to FIG. 7.

In operation S400, the memory controller 1130 may output the write data "DATA" and the data mask signal DM in synchronization with the data strobe signal DQS in a mask write operation MWR. In an embodiment, the memory controller 1130 may transmit write data through the data lines DQ1 to DQ16 in response to the data strobe signal DQS. For example, the memory controller 1130 may generate the data strobe signal DQS and may output write data through the data lines DQ1 to DQ16 in synchronization with the data strobe signal DQS. The memory controller 1130 may output the data mask signal DM through a data mask line in synchronization with the data strobe signal DQS.

Figure 7:
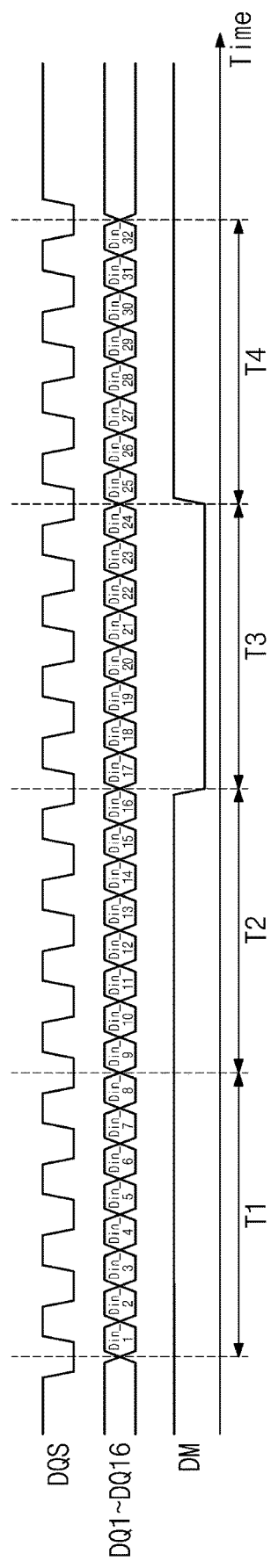
FIG. 7 is a timing diagram illustrating operation S400 of FIG. 6 in detail.

FIG. 7 is a timing diagram illustrating operation S400 of FIG. 6 in detail. Referring to FIGS. 1 and 7, the memory controller 1130 may output write data and the data mask signal DM in synchronization with the data strobe signal DQS. In an embodiment, the memory controller 1130 may transmit write data through the data lines DQ1 to DQ16 based on the data strobe signal DQS. For example, the memory controller 1130 may output write data through the data lines DQ1 to DQ16 in synchronization with a rising edge and a falling edge of the data strobe signal DQS. The memory controller 1130 may also output the data mask signal DM through a data mask line in synchronization with the data strobe signal DQS.

In an embodiment, referring to FIG. 5C, it is assumed that the dirty information DI includes the first dirtybit D1 of the first logical value, the second dirtybit D2 of the first logical value, the third dirtybit D3 of the second logical value, and the fourth dirtybit D4 of the first logical value. It is assumed that a plurality of sector data A1, A2', A3', and A4 are to be transmitted to the memory device 1200. However, the present disclosure is not limited thereto. As described above, the first logical value may mean the clean state representing that its associated cached data has not been changed since the data were uploaded to the cache memory device from the memory device, and the second logical value may mean the dirty state representing that its associated cached data has changed after being uploaded.

Because the first dirty bit D1 of the dirty information DI has the first logical value, the first sector data A1 stored in the cache memory 1120 are not stored in the memory device 1200; because the second dirty bit D2 of the dirty information DI has the first logical value, the second sector data A2' stored in the cache memory 1120 are not stored in the memory device 1200; because the third dirty bit D3 of the dirty information DI has the second logical value, the third sector data A3' stored in the cache memory 1120 are stored in the memory device 1200; and, because the fourth dirty bit D4 of the dirty information DI has the first logical value, the fourth sector data A4 are not stored in the memory device 1200.

For example, the masking of the first to eighth input data Din_1 to Din_8 corresponding to the first sector data A1 may be activated, the masking of the ninth to sixteenth input data Din_9 to Din_16 corresponding to the second sector data A2' may be activated, the masking of the seventeenth to twenty-fourth input data Din_17 to Din_24 corresponding to the third sector data A3' may be deactivated, and the masking of the twenty-fifth to thirty-second input data Din_25 to Din_32 corresponding to the fourth sector data A4 may be activated.

For example, the first to eighth data mask signals DM1 to DM8 respectively corresponding to the first to eighth input data Din_1 to Din_8 may have the second logical value, the ninth to sixteenth data mask signals DM9 to DM16 respectively corresponding to the ninth to sixteenth input data Din_9 to Din_16 may have the second logical value, the seventeenth to twenty-fourth data mask signals DM17 to DM24 respectively corresponding to the seventeenth to twenty-fourth input data Din_17 to Din_24 may have the first logical value, and the twenty-fifth to thirty-second data mask signals DM25 to DM32 respectively corresponding to the twenty-fifth to thirty-second input data Din_25 to Din_32 may have the second logical value.

In an embodiment, the first logical value corresponds to a logic low level, and the second logical value corresponds to a logic high level. The data mask signal DM may be at the logic high level during a first time period T1, may be at the logic high level during a second time period T2, may be at the logic low level during a third time period T3, and may be at the logic high level during a fourth time period T4.

In an embodiment, the data mask signal DM may correspond to a data mask (DM_n) signal which is specified in the DDR 4.0 specification. The electronic device 1000 may activate or deactivate a data mask function by setting a mode register. The electronic device 1000 may activate or deactivate the data mask function through a tenth address A10 of a fifth mode register MR5. The electronic device 1000 may deactivate the data mask function by setting the tenth address A10 of the fifth mode register MR5 to "0" and may activate the data mask function by setting the tenth address A10 of the fifth mode register MR5 to "1".

In an embodiment, referring to FIG. 5C, the memory controller 1130 may receive the dirty information DI that includes the first dirty bit D1 of the first logical value, the second dirty bit D2 of the first logical value, the third dirty bit D3 of the second logical value, and the fourth dirty bit D4 of the first logical value. The memory controller 1130 may transmit the DM_n signal based on the dirty information DI.

For example, the memory controller 1130 may mask the first to eighth input data Din_1 to Din_8 by setting the DM_n signal to the logic low level during the first time period T1, may mask the ninth to sixteenth input data Din_9 to Din_16 by setting the DM_n signal to the logic low level during the second time period T2, may not mask the seventeenth to twenty-fourth input data Din_17 to Din_24 by setting the DM_n signal to the logic high level during the third time period T3, and may mask the twenty-fifth to thirty-second input data Din_25 to Din_32 by setting the DM_n signal to the logic low level during the fourth time period T4.

Figure 8:
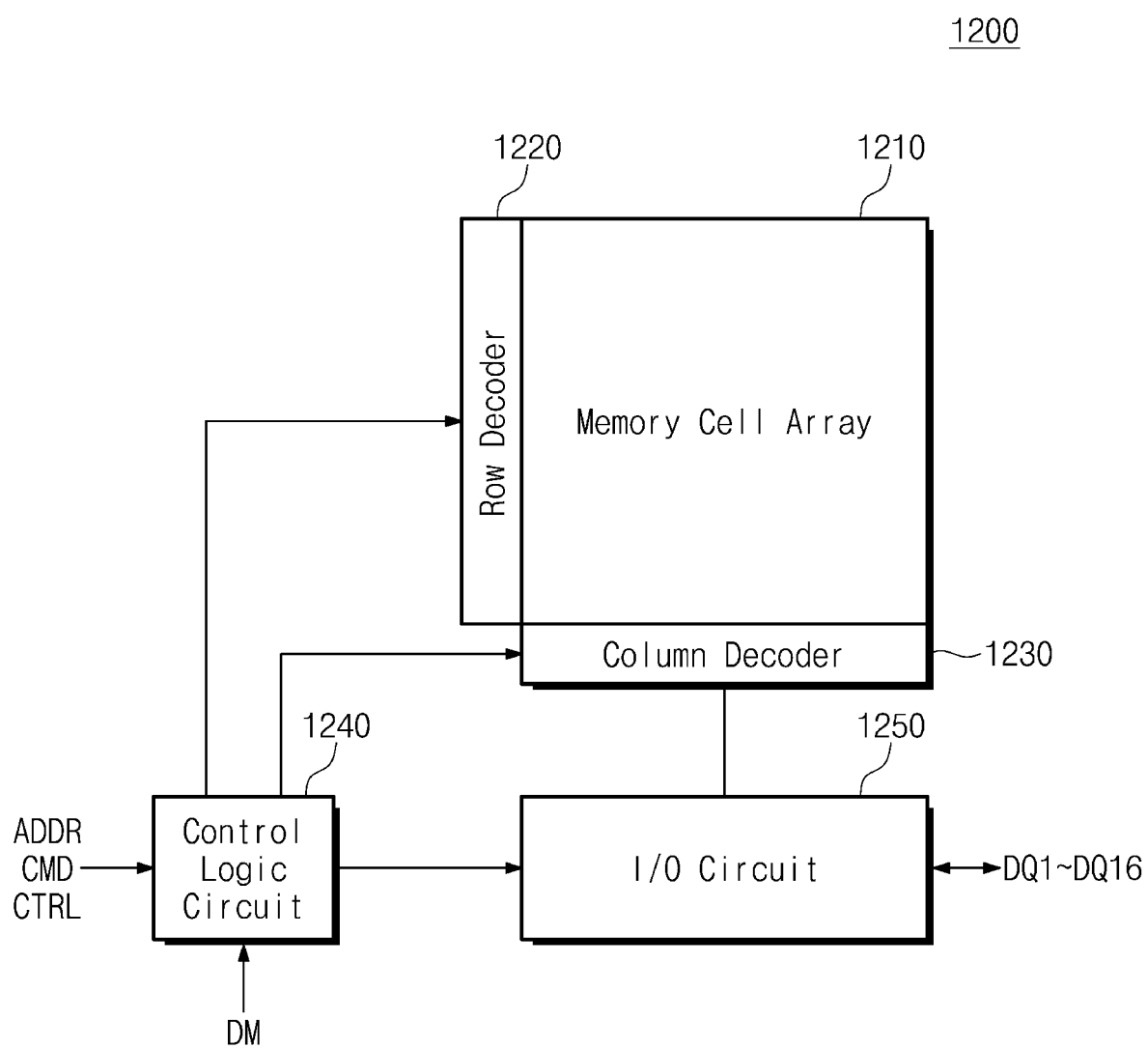
FIG. 8 is a block diagram illustrating a memory device of FIG. 1 in detail.

FIG. 8 is a block diagram illustrating a memory device of FIG. 1 in detail. Referring to FIGS. 1 and 8, the memory device 1200 may include a memory cell array 1210, a row decoder 1220, a column decoder 1230, a control logic circuit 1240, and an input/output circuit 1250.

The memory cell array 1210 may include a plurality of memory cells. Each of the plurality of memory cells may be a DRAM cell including a storage capacitor and a transistor, but the present disclosure is not limited thereto. The plurality of memory cells may be connected with a plurality of word lines and a plurality of bit lines.

The row decoder 1220 may select at least one word line of the plurality of word lines under control of the control logic circuit 1240 and may drive the selected word line. The column decoder 1230 may select at least one bit line of the plurality of bit lines under control of the control logic circuit 1240 and may drive the selected bit line.

The control logic circuit 1240 may receive the address ADDR, the command CMD, and the control signal CTRL from the memory controller 1130 and may control components of the memory device 1200 based on the received signals. The control logic circuit 1240 may receive the data mask signal DM from the memory controller 1130 through the data mask line.

The control logic circuit 1240 may selectively store data in the memory cell array 1210 based on the data mask signal DM. In an embodiment, when the data mask signal DM has the first logical value, the control logic circuit 1240 may store the corresponding input data in the memory cell array 1210. When the data mask signal DM has the second logical value, the control logic circuit 1240 does not store the corresponding input data in the memory cell array 1210.

The input/output circuit 1250 may receive the write data "DATA" from the memory controller 1130 through the data lines DQ1 to DQ16, together with the data strobe signal DQS.

As described above, in the electronic device 1000 according to an embodiment of the present disclosure, a dirty bit may be managed in units of sector smaller in size than a cache line, dirty information may be provided to a memory controller, and a memory device may selectively store data based on the data mask signal DM. As a result, the stability of system may be improved, and power consumption may be minimized.

Figure 9A:
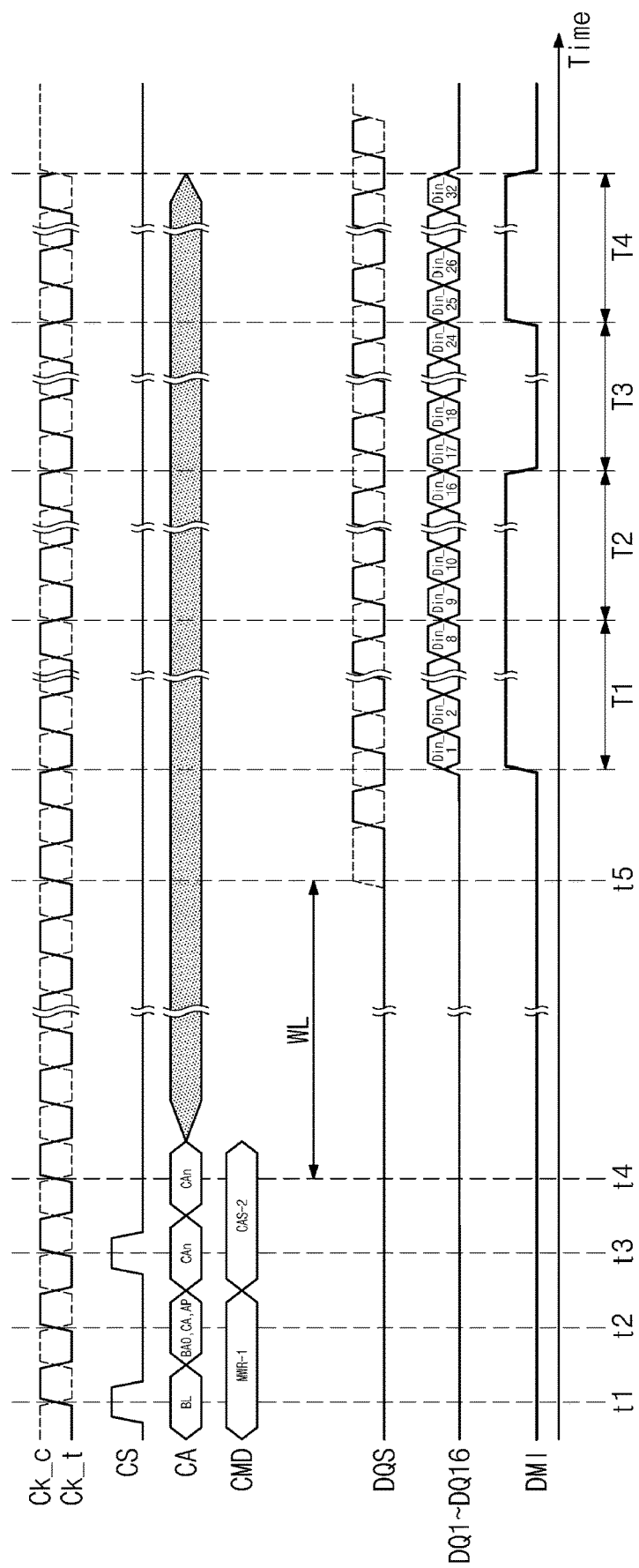
FIGS. 9A and 9B are timing diagrams for describing an operation of a memory device of FIG. 1.
Figure 9B:
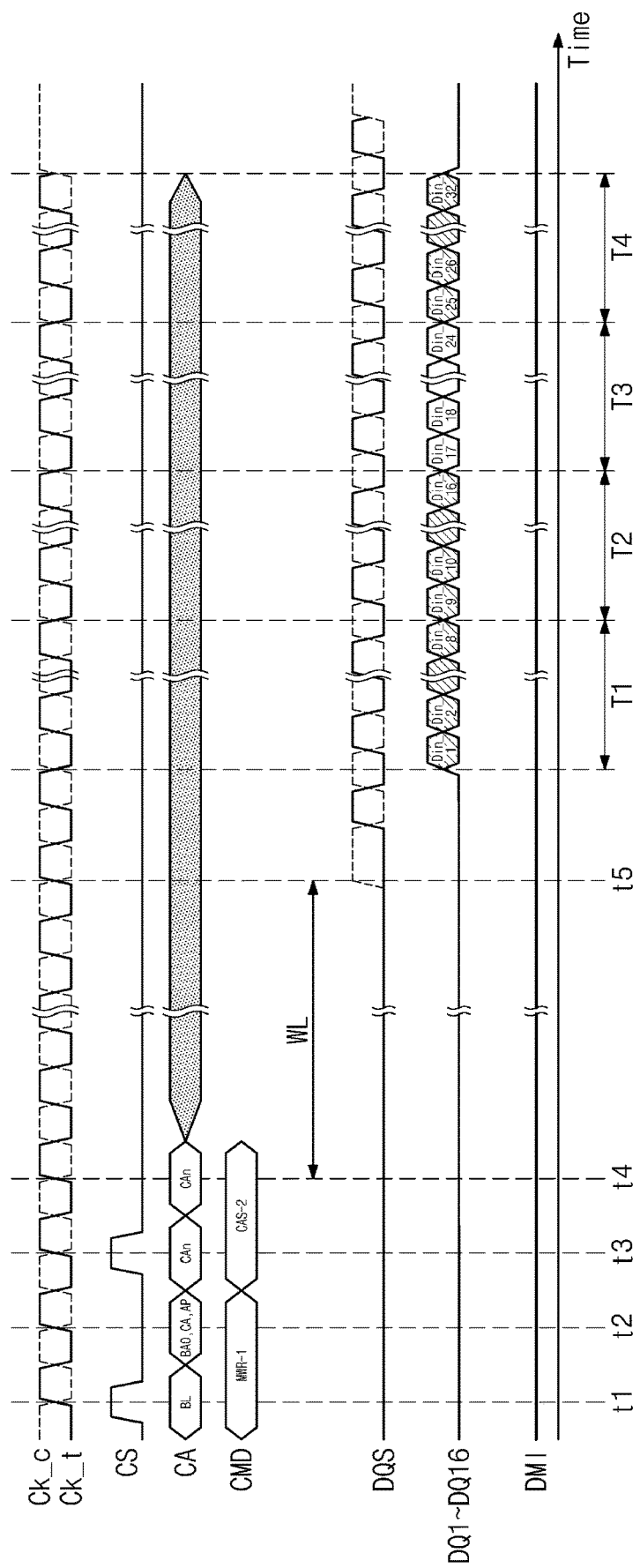

FIGS. 9A and 9B are timing diagrams for describing an operation of a memory device of FIG. 1. A mask write (MWR) operation will be described with reference to FIGS. 9A and 9B. The MWR operation may correspond to various operations that are supported through various standard interfaces, which are defined by the Joint Electron Device Engineering Council (JEDEC) standard, such as a Low-Power Double Data Rate (LPDDR) DRAM standard, a Double Data Rate (DDR) DRAM standard, and a Graphic DDR (GDDR) standard. Referring to FIGS. 1 and 9, the electronic device 1000 may perform the mask write operation based on the timing diagram illustrated in FIG. 9.

The electronic device 1000 may perform the data mask function and a data bus inversion (DBI) function through the DMI signal. The electronic device 1000 may activate or deactivate each of the data mask function and the data bus inversion function by setting a mode register. The electronic device 1000 may activate or deactivate the data bus inversion function through a seventh operation code OP[7] of a third mode register MR3. The electronic device 1000 may activate or deactivate the data mask function through a fifth operation code OP[5] of a thirteenth mode register MR13.

The electronic device 1000 may activate the data bus inversion function by setting the seventh operation code OP[7] of the third mode register MR3 to "1" and may deactivate the data bus inversion function by setting the seventh operation code OP[7] to "0". The electronic device 1000 may activate the data mask function by setting the fifth operation code OP[5] of the thirteenth mode register MR13 to "0" and may deactivate the data mask function by setting the fifth operation code OP[5] to "1".

First, it will be described that when the data mask function is activated, and the data bus inversion function is deactivated, how the MWR operation is implemented. In an embodiment, the data mask inversion (DMI) signal is used as a data mask signal as discussed above with reference to FIGS. 1 through 7. For example, the memory controller 1130 may transmit a burst length BL through a command/address signal CA at a first time t1, and may transmit a bank address BA, a column address CA, and an auto-precharge AP through the command/address signal CA at a second time t2. The burst length BL, the bank address BA, the column address CA, and the auto-precharge AP transmitted at the first and second times t1 and t2 may constitute a first MWR command MWR-1. In an embodiment, the burst length BL included in the first MWR command MWR-1 and the bank address BA, the column address CA, and the auto-precharge AP included in the first MWR command MWR-1 may be distinguished from each other by setting a chip select signal CS to the logic high level at the first time t1 and setting the chip select signal CS to the logic low level at the second time t2.

Immediately after the first MWR command MWR-1 is transmitted, the electronic device 1000 may transmit column addresses CAn through the command/address signal CA at a third time t3 and a fourth time t4, respectively. The two column addresses CAn may constitute a second CAS command CAS-2. In an embodiment, the two column addresses CAn included in the second CAS command CAS-2 may be distinguished from each other by setting the chip select signal CS to the logic high level at the third time t3 and setting the chip select signal CS to the logic low level at the fourth time t4.

In an embodiment, Table 1 below shows a command truth table of the first MWR command MWR-1 and the second CAS command CAS-2, which are based on the protocol of the LPDDR 4.0 specification.

TABLE 1

|  | CS | CA0 | CA1 | CA2 | CA3 | CA4 | CA5 | CK_t |
|---|---|---|---|---|---|---|---|---|
| MRW-1 | H | L | L | H | H | L | L | R1 |
|  | L | BA0 | BA1 | BA2 | V | C9 | AP | R2 |
| CAS-2 | H | L | H | L | L | H | C8 | R1 |
|  | L | C2 | C3 | C4 | C5 | C6 | C7 | R2 |

As shown in Table 1 above, the first MWR command MWR-1 and the second CAS command CAS-2 may be transmitted by controlling the chip select signal CS and a plurality of command/address signals CA. For example, the command/address signal CA may include the 0-th to fifth command/address signals CA0 to CA5. The memory controller 1130 may transmit a first portion of the first MWR command MWR-1 by setting the chip select signal CS, and second and third command/address signals CA2 and CA3 to "H" (high), and setting 0-th, first, fourth, and fifth command/address signals CA0, CA1, CA4, and CA5 to "L" (low), at a first rising edge R1 of the clock signal CK_t (e.g., at the first time t1). The memory controller 1130 may transmit a second portion of the first MWR command MWR-1 by setting the chip select signal CS to "L" and setting 0-th to second bank addresses BA0 to BA2 as the 0-th to second command/address signals CA0 to CA2, respectively, setting the fourth command/address signal CA4 as a ninth column address C9, and setting the fifth command/address signal CA5 as the auto-precharge AP, at a second rising edge R2 of the clock signal CK_t (e.g., at the second time t2). For example, the memory controller 1130 may transmit the first MWR command MWR-1 by setting the chip select signal CS and the plurality of command/address signals CA0 to CA5 at two rising edges R1 and R2 of the clock signal CK_t according to the command truth table as shown in Table 1 above. Likewise, the memory controller 1130 may transmit a first portion of the second CAS command CAS-2 by setting the chip select signal CS and the first and fourth command/address signals CA1 and CA4 to "H", setting the 0-th, second, and third command/address signals CA0, CA2, and CA3 to "L", and setting an eighth column address C8 as the fifth command/address signal CA5, at the first rising edge R1 of the clock signal CK_t (e.g., at the third time t3) after the first MWR command MWR-1 is transmitted. Afterwards, the memory controller 1130 may transmit a second portion of the second CAS command CAS-2 by setting the chip select signal CS to "L" and setting second to seventh column addresses C2 to C7 as the 0-th to fifth command/address signals CA0 to CA5, respectively. For example, the memory controller 1130 may transmit the second CAS command CAS-2 by setting the chip select signal CS and the plurality of command/address signals CA0 to CA5 at two rising edges R1 and R2 of the clock signal CK_t according to the command truth table as shown in Table 1 above.

In an embodiment, the data strobe signal DQS may start to be toggled after a write latency WL passes from a time t4 at which the second CAS command CAS-2 is transmitted. Input data may be transmitted through data lines DQ in synchronization with the data strobe signal DQS. The data mask inversion signal DMI may be transmitted in synchronization with the data strobe signal DQS.

In an embodiment, referring to FIG. 5C, the memory controller 1130 may receive the dirty information DI that includes the first dirty bit D1 of the first logical value, the second dirty bit D2 of the first logical value, the third dirty bit D3 of the second logical value, and the fourth dirty bit D4 of the first logical value. The memory controller 1130 may transmit the DMI signal based on the dirty information DI.

For example, the memory controller 1130 may mask the first to eighth input data Din_1 to Din_8 by setting the DMI signal, which is used as the data mask signal as described above with reference to FIGS. 1 through 7, to the logic high level during the first time period T1, may mask the ninth to sixteenth input data Din_9 to Din_16 by setting the DMI signal to the logic high level during the second time period T2, may not mask the seventeenth to twenty-fourth input data Din_17 to Din_24 by setting the DMI signal to the logic low level during the third time period T3, and may mask the twenty-fifth to thirty-second input data Din_25 to Din_32 by setting the DMI signal to the logic high level during the fourth time period T4.

It will be described that when both the data mask function and the data bus inversion function are activated, how the MWR operation is implemented with reference to FIG. 9B. The first MWR command MWR-1 and the second CAS command CAS-2 are more fully described above, and thus, additional description will be omitted to avoid redundancy.

Because the data bus inversion function is activated, the case where the DMI signal is at the logic high level may indicate that the corresponding data are inverted, and the case where the DMI signal is at the logic low level may indicate that the corresponding data are not inverted. That is, unlike FIG. 9A, when the data bus inversion function is activated, the memory controller 1130 does not use the DMI signal in the data mask function. Instead, the memory controller 1130 may transmit masked write data through the data lines DQ1 to DQ16.

For example, data corresponding to the case where the DMI signal is set to the logic low level and the number of 1's of data bits transmitted through the second to seventh data lines DQ2 to DQ7 is 5 or more may be regarded as masked data, or the data corresponding to the case where the DMI signal is set to the logic low level and the number of 1's of data bits transmitted through the tenth to fifteenth data lines DQ10 to DQ15 is 5 or more may be regarded as masked data.

In an embodiment, referring to FIG. 5C, the memory controller 1130 may receive the dirty information DI that includes the first dirty bit D1 of the first logical value, the second dirty bit D2 of the first logical value, the third dirty bit D3 of the second logical value, and the fourth dirty bit D4 of the first logical value. The memory controller 1130 may generate masked data based on the dirty information DI.

In an embodiment, during the first to fourth time periods T1 to T4, the memory controller 1130 may set the DMI signal to the logic low level. Because the third dirty bit D3 is set to the second logical value, data corresponding to the third dirty bit D3 may not be masked. The seventeenth to twenty-fourth input data Din_17 to Din_24 may not be changed. In contrast, because the first, second, and fourth dirty bits D1, D2, and D4 are set to the first logical value, data corresponding to the first, second, and fourth dirty bits D1, D2, and D4 may be masked. The first to eighth input data Din_1 to Din_8, the ninth to sixteenth input data Din_9 to Din_16, and the twenty-fifth to thirty-second input data Din_25 to Din_32 may be changed to masked data before transmission. In each of the first, second, and fourth time periods T1, T2, and T4, the number of 1's of data bits transmitted to the second to seventh data lines DQ2 to DQ7 may be at least 5 or more, or the number of 1's of data bits transmitted to the tenth to fifteenth data lines DQ10 to DQ15 may be at least 5 or more.

As described above, the memory controller 1130 may provide input data and a data mask signal to the memory device 1200 based on the MWR operation described with reference to FIGS. 9A and 9B.

Figure 10A:
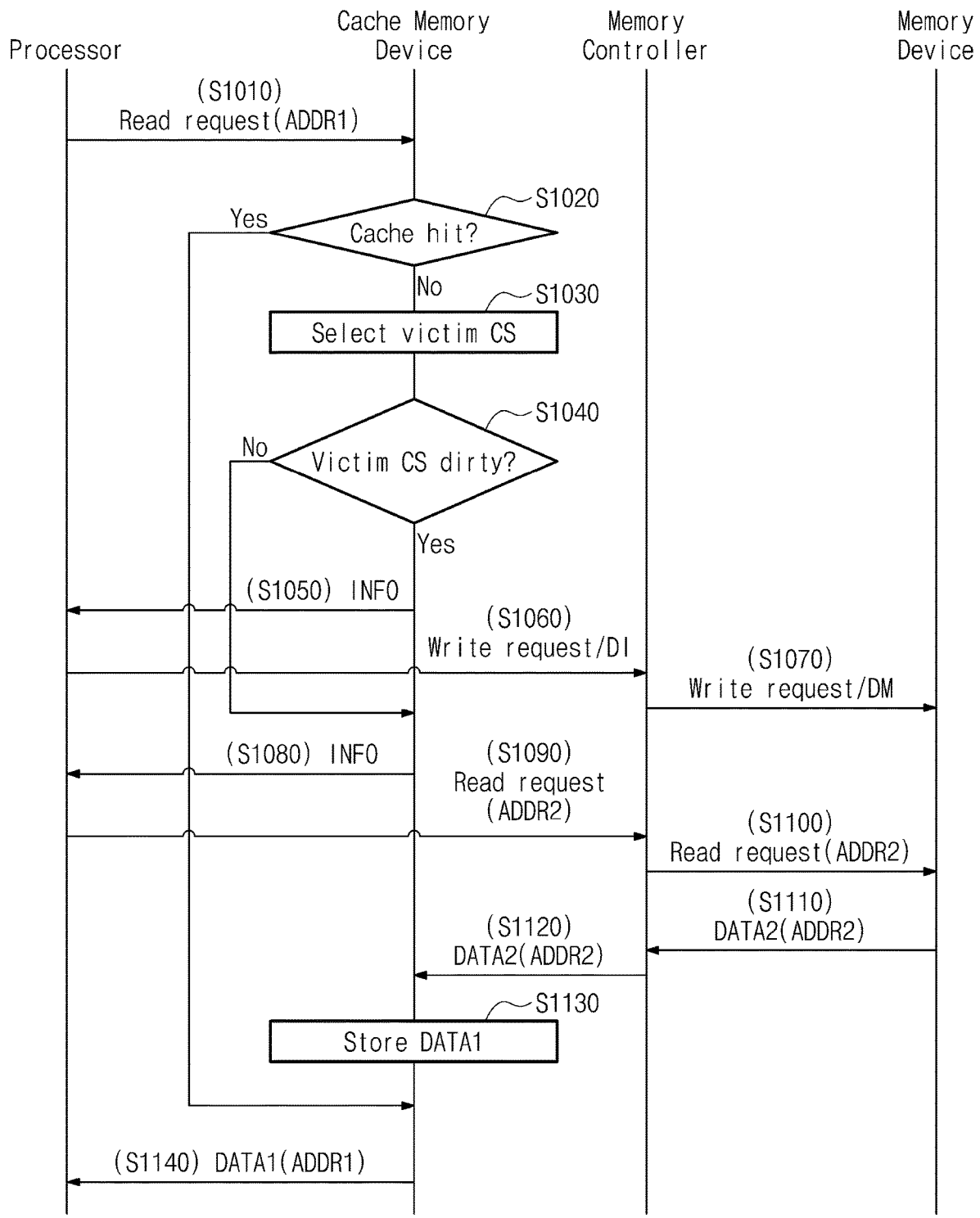
FIGS. 10A to 10C are flowcharts illustrating operations of an electronic device of FIG. 1.

FIG. 10A is a flowchart illustrating an operation of an electronic device of FIG. 1, according to an embodiment. Referring to FIGS. 1, 2, and 4, in operation S1010, the processor 1110 may transmit a read request including a first address ADDR1 to the cache memory device 1120. The first address ADDR1 may be an address corresponding to a storage space of the memory device 1200, in which read data are stored.

In operation S1020, in response to the read request, the cache memory device 1120 may determine whether data corresponding to the first address ADDR1 are stored in the cache memory device 1120. For example, the cache memory device 1120 may determine whether a cache hit or a cache miss occurs, based on the tag TAG. The cache memory device 1120 may determine whether a cache hit or a cache miss occurs, based on a result of comparing the tag TAG and the first address ADDR1 from the processor 1110 or a result of comparing the tag TAG and at least a portion of the first address ADDR1.

In an embodiment, the cache memory device 1120 may select cache sets, which include the tags TAG corresponding to the first address ADDR1 or a portion of the first address ADDR1, from among a plurality of cache sets and may read the tags TAG of the selected cache sets. The cache memory device 1120 may compare the tag TAG and the first address ADDR1 to determine whether a cache hit or a cache miss occurs. However, the present disclosure is not limited thereto. For example, whether a cache hit or a cache miss occurs may be determined in various methods. When it is determined that a cache hit occurs, in operation S1140, the cache memory device 1120 may transmit first data DATA1 corresponding to the first address ADDR1 to the processor 1110.

When it is determined that a cache miss occurs, the cache memory device 1120 performs operation S1030. To allocate a new cache set for storing data corresponding to the first address ADDR1 from the processor 1110, the cache memory device 1120 may select a cache set with a valid bit "V" of the first logical value among the plurality of cache sets. If no cache set with a valid bit "V" of the first logical value remains in the cache memory 1120, one victim cache set may be selected from the plurality of cache sets to be flushed. In an embodiment, the cache memory device 1120 may select a victim cache set, for example, in a manner to select the least recently used cache set (LRU), in a manner to select the most recently used cache set (MRU), or in a manner to select a first in first out cache set (FIFO).

In operation S1040, the cache memory device 1120 may determine whether the victim cache set is in the dirty state. In an embodiment, when at least one of the plurality of dirty bits D1 to D4 of the victim cache set indicates the second logical value, the cache memory device 1120 may determine that the victim cache set is in the dirty state. When the victim cache set is not in the dirty state, that is, in the clean state, in operation S1080, the cache memory device 1120 may transmit cache information INFO including cache miss information without performing the flush operation on the victim cache set. When the victim cache set is in the dirty state, the cache memory device 1120 performs operation S1050 to perform the flush operation on the victim cache set.

In operation S1050, the cache memory device 1120 may transmit the cache information INFO to the processor 1110. In an embodiment, the cache information INFO may include information about the victim cache set.

In operation S1060, the processor 1110 may perform the flush operation associated with the victim cache set in response to the cache information INFO including the information about the victim cache set. The processor 1110 may transmit a write request to the memory controller 1130. In an embodiment, the processor 1110 may transmit the write request including an address indicating a cache line of the memory device 1200, which corresponds to the victim cache set. The processor 1110 may transmit the dirty information DI including the first to fourth dirty bits D1 to D4 of the victim cache set to the memory controller 1130. The processor 1110 may transmit cached data of the victim cache set to the memory controller 1130.

In operation S1070, based on the dirty information DI, the cached data, and a write request including an address, the memory controller 1130 may transmit the data mask signal DM to the memory device 1200 together with the cached data of the victim cache set. In an embodiment, the memory controller 1130 may receive the write request including the address, the dirty information DI, and the cached data. The memory controller 1130 may sequentially arrange the cached data such that the cached data are output to the first to sixteenth data lines DQ1 to DQ16 a predetermined number (e.g., the burst length) of times. The memory controller 1130 may generate the data mask signal DM based on the dirty information DI. The memory controller 1130 may output the data and the data mask signal DM in synchronization with the data strobe signal DQS. This is described above, and thus, additional description will be omitted to avoid redundancy.

In operation S1080, the cache memory device 1120 may transmit the cache information INFO to the processor 1110. In an embodiment, the cache information INFO may include cache miss information about the first address ADDR1.

In an embodiment, when the victim cache set is in the dirty state, operation S1080 may be omitted, and in operation S1050, the cache memory device 1120 may transmit the cache information INFO including the cache miss information about the first address ADDR1. Also, the order of performing operation S1030 to operation S1070, and operation S1080 may be changed, or operation S1030 to operation S1070 may be performed in parallel with operation S1080. The flowchart in FIG. 10A is only one embodiment, and operation S1020 to operation S1040 may be performed by the processor 1110.

In operation S1080, in response to the cache information INFO including the cache miss information, the processor 1110 may recognize that data corresponding to the first address ADDR1 are not stored in the cache memory device 1120. In this case, the processor 1110 may transmit a read request to the memory controller 1130.

In an embodiment, the processor 1110 may transmit, to the memory controller 1130, a read request including a second address ADDR2 indicating at least one cache line of the plurality of cache lines CL1 to CLm of the memory device 1200. A cache line may be a minimum unit of data that the processor 1110 transmits to the memory device 1200 in a read or write request. Accordingly, when the first address ADDR1 does not indicate at least one of the plurality of cache lines CL1 to CLm, the processor 1110 may transmit to the memory device 1200 a read request for the second address ADDR2 indicating a cache line including the first address ADDR1.

When the first address ADDR1 indicates at least one of the plurality of cache lines CL1 to CLm, the first address ADDR1 and the second address ADDR2 may be identical. In contrast, when the first address ADDR1 is not a start address of a cache line but indicates any space in the cache line, the first address ADDR1 and the second address ADDR2 may be different.

In operation S1100, the memory controller 1130 may transmit a read request to the memory device 1200. In an embodiment, the memory controller 1130 may transmit a command and the second address ADDR2 to the memory device 1200. In operation S1110, in response to the read request, the memory device 1200 may output the second data DATA2 to the memory controller 1130.

In operation S1120, the memory controller 1130 may transmit the second data DATA2 received from the memory device 1200 to the cache memory device 1120. In operation S1130, the cache memory device 1120 may store the second data DATA2 in the victim cache set. The cache memory device 1120 may initialize the dirty bit D of the victim cache set. For example, the cache memory device 1120 may set the plurality of dirty bits D1 to D4 of the victim cache set to the first logical value.

As such, data may be damaged at an interface during a time when operation S1100 to operation S1130 are performed, or damaged data may be stored while data are stored in the cache memory device 1120. When the line fill operation from the memory device 1200 to the cache memory device 1120 is performed, with regard to the same address, data stored in the memory device 1200 may not be damaged, but damaged data may be stored in the cache memory device 1120.

In operation S1140, the cache memory device 1120 may transmit the first data DATA1 corresponding to the first address ADDR1 to the processor 1110. The first data DATA1 may be equal to or smaller than a cache line in size. The second data DATA2 may be equal to a cache line in size.

Figure 10B:
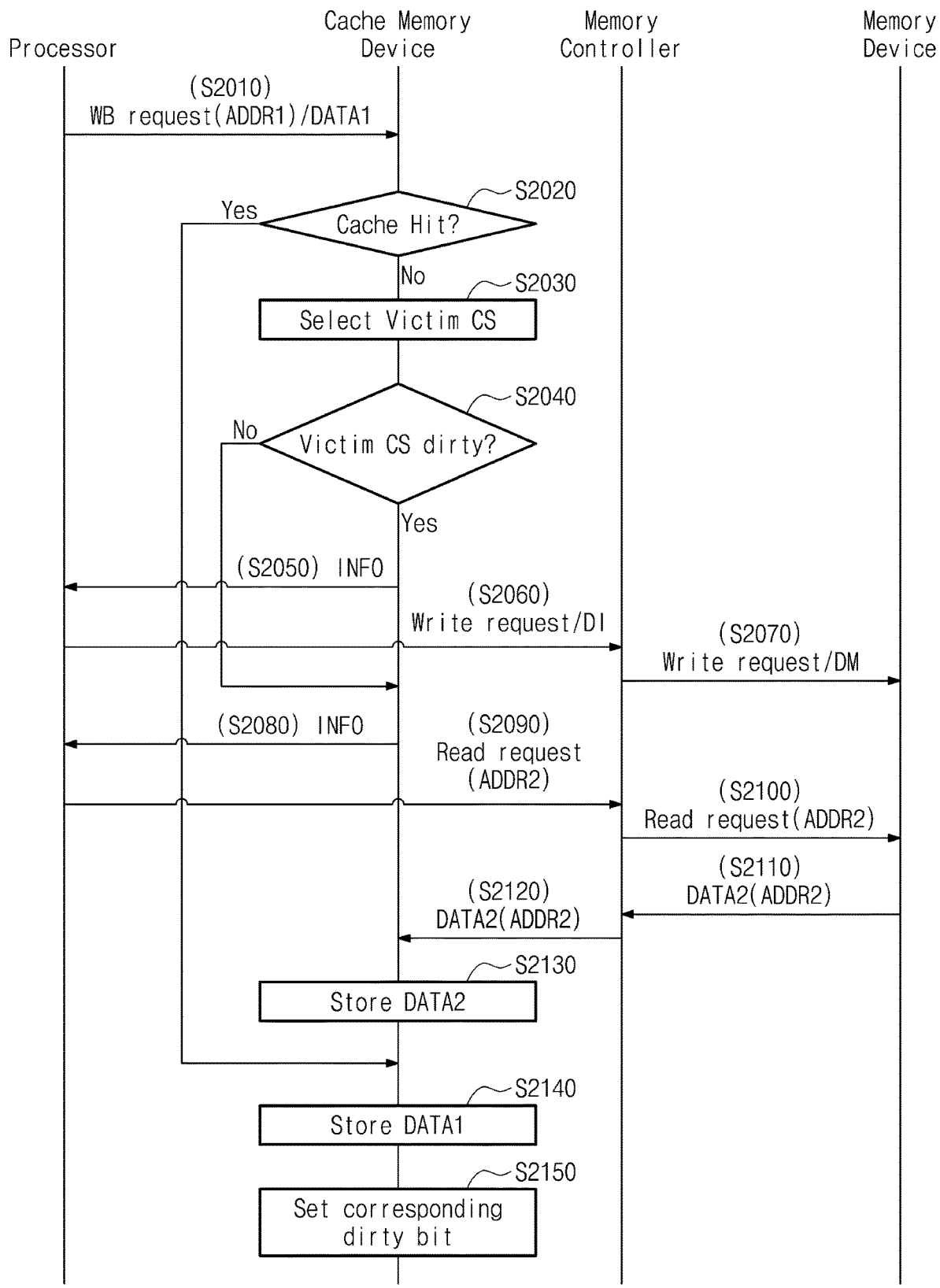

FIG. 10B is a flowchart illustrating an operation of an electronic device of FIG. 1, according to an embodiment. Referring to FIGS. 1, 2, and 4, in operation S2010, the processor 1110 may transmit a write request of a write-back manner including the first address ADDR1 and the first data DATA1 to the cache memory device 1120.

In operation S2020, in response to the write request, the cache memory device 1120 may determine whether data corresponding to the first address ADDR1 are stored in the cache memory device 1120. The cache memory device 1120 may determine whether a cache hit or a cache miss occurs, based on the tag TAG. This is described with reference to FIG. 10A in detail, and thus, additional description will be omitted to avoid redundancy. When it is determined that a cache hit occurs, the method proceeds to operation S2140. When it is determined that a cache miss occurs, the method proceeds to operation S2030.

Operation S2030 to operation S2130 are identical to operation S1030 to operation S1130 of FIG. 10A, and thus, additional description will be omitted to avoid redundancy. In operation S2140, the cache memory device 1120 may store the first data DATA1 received from the processor 1110.

In an embodiment, in the case of receiving the first data DATA1 equal in size to a cache line from the processor 1110, all the first to fourth sector data of a cache set may be updated. Alternatively, in the case of receiving the first data DATA1 equal in size to a sector from the processor 1110, only specific sector data of a plurality of sector data of a cache set may be updated.

In operation S2150, the cache memory device 1120 may set at least one dirty bit corresponding to the first data DATA1 to the second logical value indicating the dirty state. In an embodiment, in the case of receiving the first data DATA1 equal in size to a cache line from the processor 1110, all the first to fourth dirty bits D1 to D4 may be set to the second logical value. Alternatively, when the first address ADDR1 indicates the third sector S3 and the first data DATA1 equal in size to a sector are received from the processor 1110, only the third dirty bit D3 may be set to the second logical value.

Because the processor 1110 transmits the write request of the write-back manner, only data stored in the cache memory device 1120 may be updated without an update of data stored in the memory device 1200. The data stored in the cache memory device 1120 may be different from the data stored in the memory device 1200, which correspond to the updated data in the cache memory device 1120.

Figure 10C:
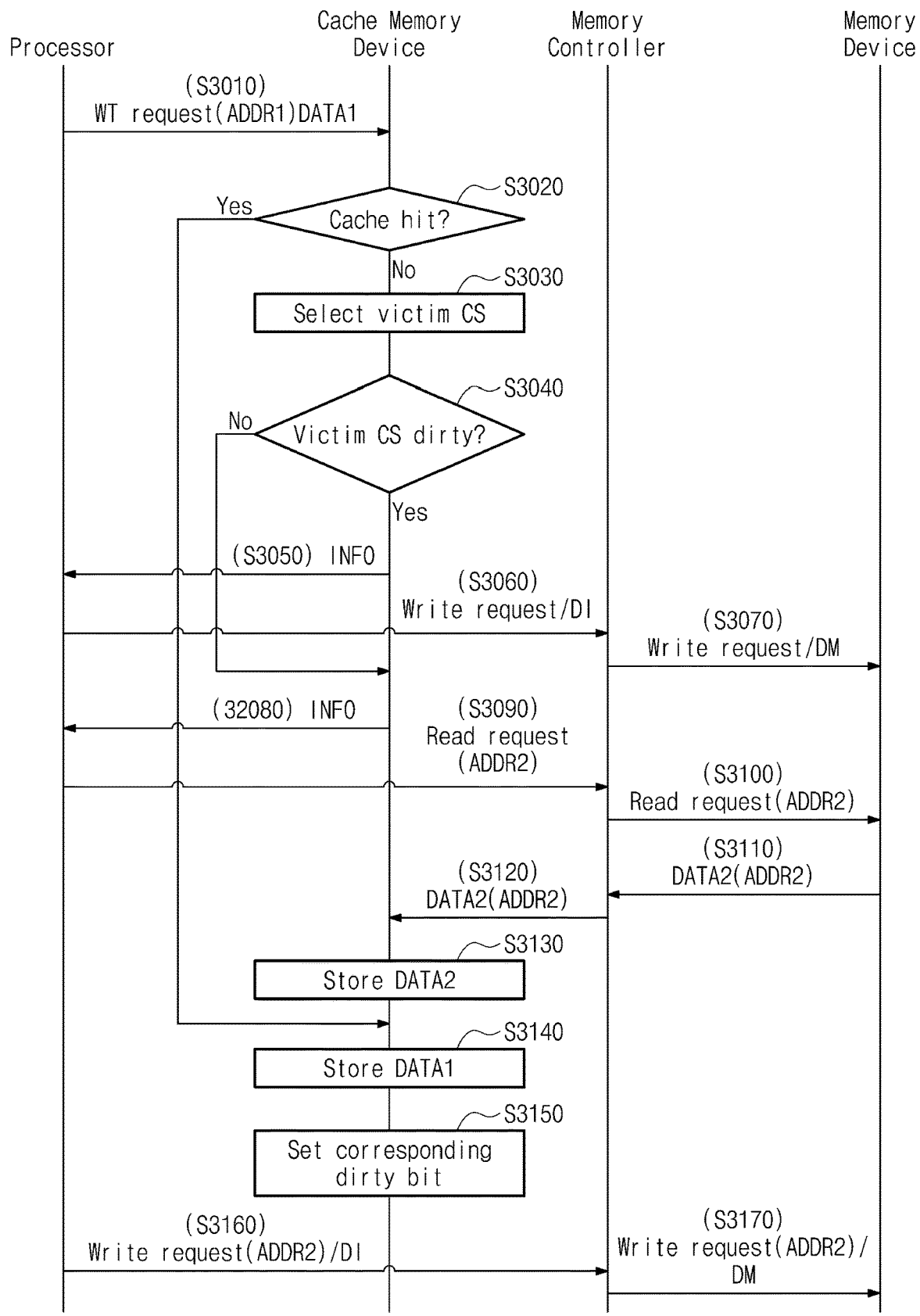

FIG. 10C is a flowchart illustrating an operation of an electronic device of FIG. 1, according to an embodiment. Referring to FIGS. 1, 2, and 4, in operation S3010, the processor 1110 may transmit the write request of the write-through manner including the first address ADDR1 and the first data DATA1 to the cache memory device 1120.

In operation S3020, in response to the write request, the cache memory device 1120 may determine whether data corresponding to the first address ADDR1 are stored in the cache memory device 1120. The cache memory device 1120 may determine whether a cache hit or a cache miss occurs, based on the tag TAG. This is described with reference to FIG. 10A in detail, and thus, additional description will be omitted to avoid redundancy. When it is determined that a cache hit occurs, the method proceeds to operation S3140. When it is determined that a cache miss occurs, the method proceeds to operation S3030.

Operation S3030 to operation S3150 are identical to operation S2030 to operation S2150 of FIG. 10B, and thus, additional description will be omitted to avoid redundancy. In operation S3160, the processor 1110 may transmit the write request of the write-through manner including the second address ADDR2, the dirty information DI, and data to the memory controller 1130. The dirty information DI may include the first to fourth dirty bits DI1 to DI4 of a cache set corresponding to the second address ADDR2. Because the processor 1110 transmits the write request of the write-through manner in operation S3010, both data stored in the cache memory device 1120 and data stored in the memory device 1200 may be updated.

In operation S3170, based on the dirty information DI, the data, and a write request including the second address ADDR2, the memory controller 1130 may transmit the data mask signal DM to the memory device 1200 together with the data from the processor 1110. In an embodiment, the memory controller 1130 may receive the write request including the address, the dirty information DI, and the data. The memory controller 1130 may sequentially arrange the data to data bits corresponding to a burst length so as to be output to the first to sixteenth data lines DQ1 to DQ16. The memory controller 1130 may generate the data mask signal DM based on the dirty information DI. The memory controller 1130 may output the data and the data mask signal DM in synchronization with the data strobe signal DQS. This is described above, and thus, additional description will be omitted to avoid redundancy.

As described above, the electronic device 1000 according to the present disclosure may manage dirty information in units of sector smaller than a cache line. The electronic device 1000 may generate a data mask signal based on dirty information managed in units of sector and may perform a write operation on the memory device 1200 in units of sector. Accordingly, a sector of the cache memory device 1120, which is not updated by the processor 1110, may not be stored in the memory device 1200. According to the above description, unnecessary data store operations may be minimized, and thus, an error in the memory device 1200 may decrease.

Figure 11:
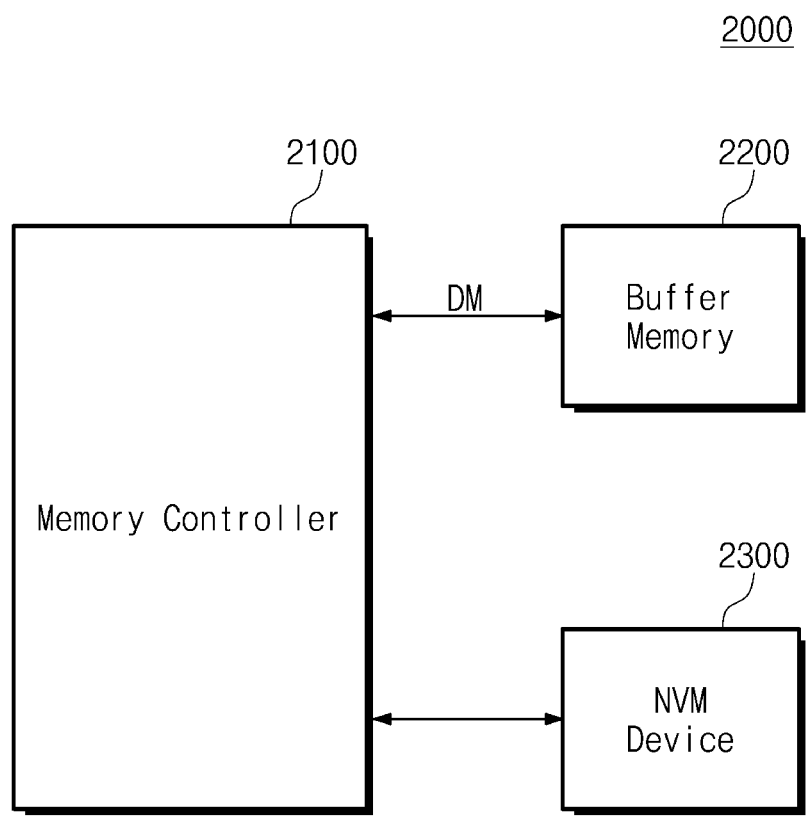
FIG. 11 is a block diagram illustrating a storage device according to an embodiment of the present disclosure.

FIG. 11 is a block diagram illustrating a storage device according to an embodiment of the present disclosure. Referring to FIG. 11, a storage device 2000 includes a memory controller 2100, a buffer memory 2200, and a nonvolatile memory device 2300. In an embodiment, the storage device 2000 may be a high-capacity storage medium such as a solid state drive (SSD), a universal serial bus (USB) memory, a hard disk drive, or a USB stick.

The memory controller 2100 may exchange data in response to a request from a host (not illustrated). In response to the request from the host, the memory controller 2100 may read data from the nonvolatile memory device 2300, may temporarily store the read data in the buffer memory 2200, and may provide the read data to the host. Also, in response to the request from the host, the memory controller 2100 may temporarily store data "DATA" received from the host in the buffer memory 2200 and may then program the data "DATA" in the nonvolatile memory device 2300.

To perform the above operation, the memory controller 2100 may provide an address, a command, and a control signal to the nonvolatile memory device 2300 and may exchange data with the nonvolatile memory device 2300. To perform the above operation, the memory controller 2100 may provide an address, a command, a control signal, and the data mask signal DM to the buffer memory 2200 and may exchange data with the buffer memory 2200.

The memory controller 2100 may manage or control the nonvolatile memory device 2300. In an embodiment, the memory controller 2100 may perform various maintenance operations, which are associated with the nonvolatile memory device 2300, such as mapping table management, bad block management, and wear leveling.

The buffer memory 2200 may operate under control of the memory controller 2100. For example, in response to signals received from the memory controller 2100, the buffer memory 2200 may store data or may provide the stored data to the memory controller 2100. In an embodiment, the buffer memory 2200 may be a dynamic random access memory (DRAM) device, but the present disclosure is not limited thereto.

The buffer memory 2200 may store a mapping table associated with the nonvolatile memory device 2300. In an embodiment, the buffer memory 2200 may temporarily store data received from the host. Alternatively, the buffer memory 2200 may temporarily store data read from the nonvolatile memory device 2300.

In response to signals received from the memory controller 2100, the nonvolatile memory device 2300 may output data or may program received data. In an embodiment, the nonvolatile memory device 2300 may include a NAND flash memory. However, embodiments may not be limited thereto. For example, the nonvolatile memory device 2300 may include a volatile memory, such as a static RAM (SRAM), a DRAM, or a synchronous DRAM (SDRAM), or a nonvolatile memory, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), or a ferroelectric RAM (FRAM).

Figure 12:
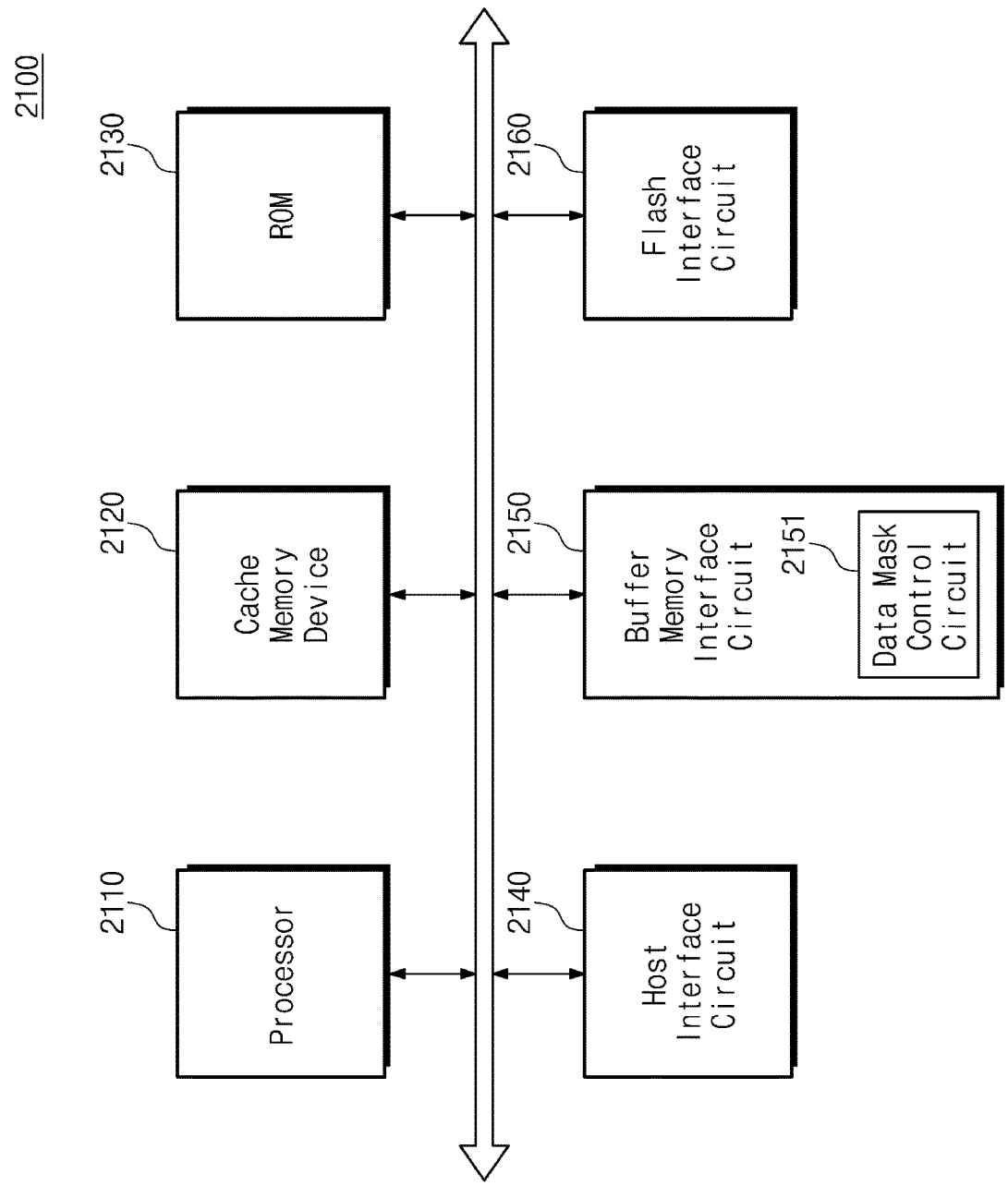
FIG. 12 is a block diagram illustrating a memory controller of FIG. 11.

FIG. 12 is a block diagram illustrating a memory controller of FIG. 11. Referring to FIGS. 11 and 12, the memory controller 2100 may include a processor 2110, a cache memory device 2120, a read only memory (ROM) 2130, a host interface circuit 2140, a buffer memory interface circuit 2150, and a flash interface circuit 2160.

The processor 2110 may control overall operations of the memory controller 2100. The cache memory device 2120 may be a static random access memory (SRAM) device. The ROM 2130 may store a variety of information necessary for the memory controller 2100 to operate in the form of firmware.

In an embodiment, various information (e.g., a flash translation layer and a mapping table) necessary to control the nonvolatile memory device 2300 may be stored to the cache memory device 2120 or the buffer memory 2200 and may be managed or driven by the processor 2110.

The cache memory device 2120 may support an access speed higher than the buffer memory 2200. As a portion of data stored in the buffer memory 2200 is stored in the cache memory device 2120, a speed at which an access according to a request of the processor 2110 is made may be improved. The cache memory device 2120 may include a plurality of cache sets. The cache memory device 2120 may manage a dirty bit in units of sector, not in units of a cache line. In an embodiment, the cache memory device 2120 may include first to fourth dirty bits. A cache set is described with reference to FIG. 4 in detail, and thus, additional description will be omitted to avoid redundancy.

The memory controller 2100 may communicate with an external device (e.g., a host) through the host interface circuit 2140. In an embodiment, the host interface circuit 2140 may be based on at least one of various interfaces such as a double data rate (DDR) interface, a universal serial bus (USB) interface, a multimedia card (MMC) interface, a peripheral component interconnection (PCI) interface, a PCI-express (PCIe) interface, an advanced technology attachment (ATA) interface, a serial-ATA (SATA) interface, a parallel-ATA (PATA) interface, a small computer small interface (SCSI) interface, an enhanced small disk interface (ESDI), an integrated drive electronics (IDE) interface, a mobile industry processor interface (MIPI), and a nonvolatile memory-express (NVMe) interface.

The memory controller 2100 may communicate with the buffer memory 2200 through the buffer memory interface circuit 2150. In an embodiment, the memory controller 2100 may provide various signals to the buffer memory 2200 through the buffer memory interface circuit 2150. In an embodiment, the buffer memory interface circuit 2150 may include a DRAM interface such as a double data rate (DDR) interface, a low-power DDR (LPDDR) interface, or a universal serial bus (USB) interface.

The buffer memory interface circuit 2150 may include a data mask control circuit 2151 which operates similarly as discussed with reference to FIGS. 4 through 11. The data mask control circuit 2151 may receive the dirty information DI from the cache memory device 2120. The data mask control circuit 2151 may output a data mask signal DM through a data mask line based on the received dirty information DI so that the buffer memory interface circuit 2150 performs a flush operation using a mask write operation.

The memory controller 2100 may communicate with the nonvolatile memory device 2300 through the flash interface circuit 2160. In an embodiment, the memory controller 2100 may provide various signals (e.g., CLE, ALE, RE/, WE/, CMD, ADDR, SQRI, and DT) to the nonvolatile memory device 2300 based on the flash interface circuit 2160. In an embodiment, the flash interface circuit 2160 may include a NAND interface such as a toggle NAND interface or an open NAND flash interface (ONFI).

The memory controller 2100 illustrated in FIG. 12 is, and the present disclosure is not limited thereto. The memory controller 2100 may further include various components such as an error correction code (ECC) engine and a randomizer.

As described with reference to FIGS. 1 to 10C, the storage device 2000 according to an embodiment of the present disclosure may manage dirty information in units of sector smaller in size than a cache line. The storage device 2000 may output the data mask signal DM to the buffer memory 2200 through the data mask line based on the dirty information. The buffer memory 2200 does not store sector data of the cache memory device 2120, which are not updated, based on the data mask signal DM.

Figure 13:
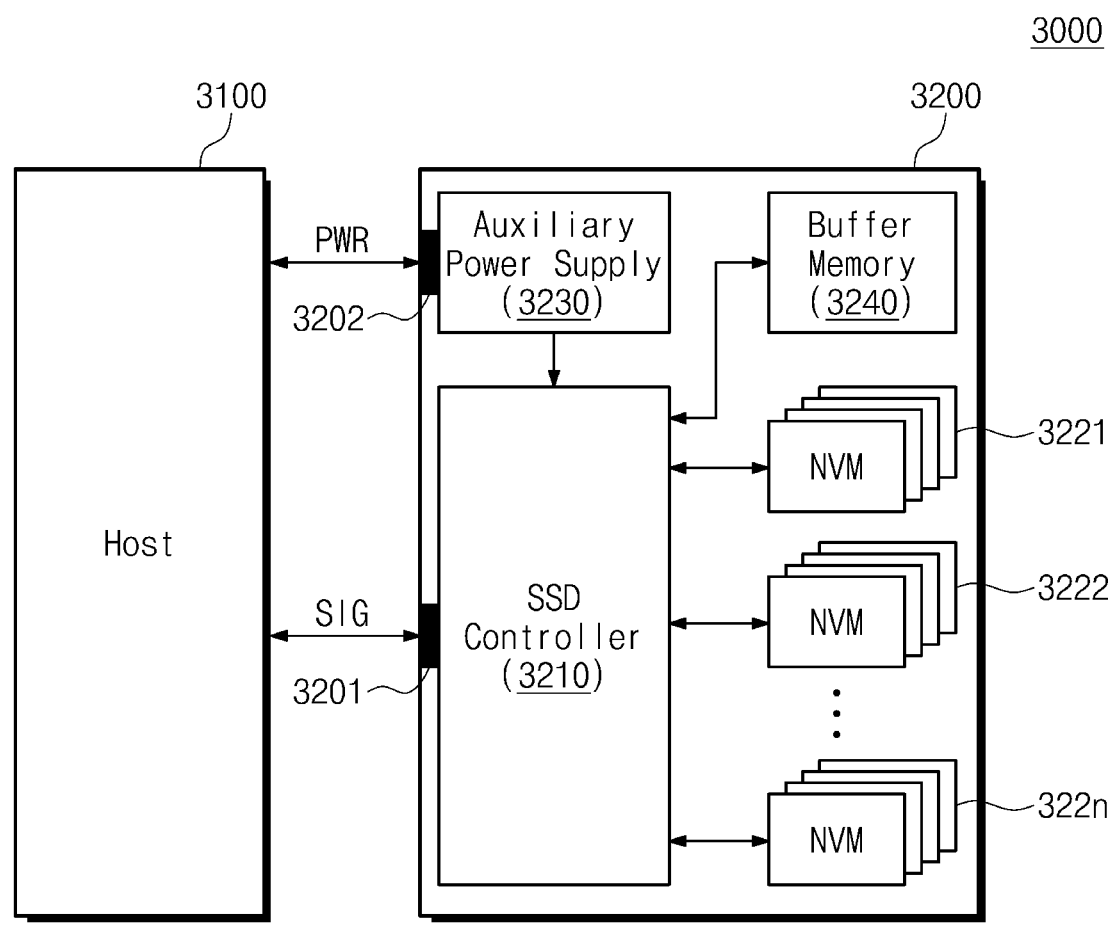
FIG. 13 is a block diagram illustrating an SSD system according to the present disclosure.

FIG. 13 is a block diagram illustrating an SSD system 3000 according to an embodiment of the present disclosure. Referring to FIG. 13, the SSD system 3000 includes a host 3100 and an SSD 3200.

The SSD 3200 exchanges signals SIG with the host 3100 through a signal connector 3201 and is supplied with a power PWR through a power connector 3202. The SSD 3200 includes an SSD controller 3210, a plurality of flash memories 3221 to 322*n*, an auxiliary power supply 3230, and a buffer memory 3240. In an embodiment, the SSD controller 3210 may manage dirty information in units of sector and may generate a data mask signal based on the dirty information, which is described with reference to FIGS. 1 to 12. Accordingly, a sector of a cache memory device, which is not updated, may not be stored in the buffer memory 2200. According to the above description, unnecessary data store operations may be minimized, and thus, an error in the buffer memory 3240 may decrease.

The SSD controller 3210 may control the plurality of flash memories 3221 to 322*n* in response to the signals SIG received from the host 3100. The plurality of flash memories 3221 to 322*n* may operate under control of the SSD controller 3210. The auxiliary power supply 3230 is connected with the host 3100 through the power connector 3202. The auxiliary power supply 3230 may be charged by the power PWR supplied from the host 3100. When the power PWR is not smoothly supplied from the host 3100, the auxiliary power supply 3230 may power the SSD 3200.

According to the present disclosure, as dirty information is stored in a cache memory device in units of sector smaller in size than a cache line and the dirty information is provided to a memory controller, the memory controller may generate a data mask signal. A memory device may selectively store data based on the data mask signal received from the memory controller. As such, data of the cache memory device, which are not updated, may be prevented from being stored in the memory device. Accordingly, an electronic device having improved stability and capable of minimizing power consumption, a system-on-chip, and an operating method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a cache memory including a memory space configured to store a first cache set including a plurality of sector data and a plurality of dirty bits, each of the plurality of dirty bits representing whether corresponding sector data of the plurality of sector data are modified;
a memory controller connected to a plurality of data lines and a data mask line, and configured to:
receive the plurality of sector data and the plurality of dirty bits from the cache memory,
set a logic level of a data mask signal based on a logic level of each of the plurality of dirty bits, and
output the plurality of sector data through the plurality of data lines and the data mask signal through the data mask line; and
a memory device connected to the plurality of data lines and the data mask line, and configured to:
receive the plurality of sector data through the plurality of data lines, and
receive the data mask signal through the data mask line,
wherein the memory controller is further configured to transmit a first mask write (MWR) command to the memory device through a plurality of command/address (CA) lines,
wherein the memory device, after receiving the first MWR command, receives the plurality of sector data and the data mask signal,
wherein the memory controller is configured to:
activate, based on a logic value of a first operation code, a data mask function of the memory device, the logic value of the first operation code being stored in a first mode register of the memory device, wherein the memory controller transmit the first MWR command to the memory device in which the data mask function has been activate; and deactivate, based on a logic value of a second operation code, a data bus inversion function of the memory device, the logic value of the second operation code being stored in a second mode register of the memory device, and wherein the mask data line is a data inversion line of the memory device in which the data bus inversion function has been deactivated.

2. The electronic device of claim 1, wherein the memory controller is configured to write first sector data of the plurality of sector data stored in the cache memory to the memory device during a first time period and write second sector data of the plurality of sector data stored in the cache memory during a second time period subsequent to the first time period, wherein the memory controller is configured to issue the data mask signal to the memory device, and wherein the memory controller is configured to:

set, based on a logic level of a first dirty bit associated with the first sector data, a logic level of the data mask signal to be applied during the first time period; and set, based on a second dirty bit associated with the second sector data, a logic level of the data mask signal to be applied during the second time period.

3. The electronic device of claim 2, wherein in response to the logic level of the first dirty bit indicating that the first sector data are not modified, the memory controller deactivates the data mask signal during the first time period so that the memory device, in response to the first MWR command and the deactivated data mask signal, blocks the first sector data from being stored in the memory device, and wherein in response to the logic level of the second dirty bit indicating that the second sector data are modified, the memory controller activates the data mask signal during the second time period so that the memory device, in response to the first MWR command and the activated data mask signal, stores the second sector data received from the memory controller.

4. The electronic device of claim 1, wherein a size of each of the plurality of sector data is smaller than a size of a cache line, and wherein the size of the cache line is a minimum access unit of data to be transmitted to the memory device in response to a write request of the memory controller.

5. An operating method of an electronic device which includes a cache memory including a memory space configured to store a first cache set including a plurality of sector data and a plurality of dirty bits, each of the plurality of dirty bits representing whether corresponding sector data of the plurality of sector data stored in the cache memory are modified, a memory device, and a memory controller between the cache memory and the memory device, the method comprising:

setting, by the memory controller, a logic level of a data mask signal based on a logic level of each of the plurality of dirty bits;

issuing, by the memory controller, a first mask write (MWR) command to the memory device through command/address (CA) lines connected thereto;

transmitting, by the memory controller, the plurality of sector data stored in the cache memory to the memory device through a plurality of data lines connected thereto, and a data mask signal to the memory device through a data mask line connected thereto;

receiving, by the memory device, the plurality of sector data and data mask signal after receiving the first MWR command;

activating, by the memory controller, based on a logic value of a first operation code, a data mask function of the memory device, the logic value of the first operation code being stored in a first mode register of the memory device; and deactivating, by the memory controller, based on a logic value of a second operation code, a data bus inversion function of the memory device, the logic value of the second operation code being stored in a second mode register of the memory device, wherein the first MWR command is transmitted to the memory device in which the data mask function has been activated and the data bus inversion function has been deactivated.

6. The method of claim 5, wherein the transmitting of the plurality of sector data and the data mask signal includes:

outputting, by the memory controller, first sector data of the plurality of sector data stored in the cache memory through the plurality of data lines during a first time period; and outputting, by the memory controller, second sector data of the plurality of sector data stored in the cache memory through the plurality of data lines during a second time period, and wherein the setting of the logic level of the data mask signal includes:

setting, based on a logic level of a first dirty bit associated with the first sector data, a logic level of the data mask signal to be applied during the first time period; and setting, based on a logic level of a second dirty bit associated with the second sector data, a logic level of the data mask signal to be applied during the second time period.

7. The method of claim 5, wherein the transmitting of the plurality of sector data and the data mask signal includes:

outputting, by the memory controller, after a given time elapses from a time when the first MWR command is issued, the plurality of sector data to the memory device through the plurality of data lines connected thereto.

8. The method of claim 5, wherein a size of each of the plurality of sector data is smaller than a size of a cache line, and wherein the cache line is a minimum access unit of data to be transmitted to the memory device in response to a write request of the memory controller.

9. A solid state drive (SSD) controller comprising:

a cache memory including a memory storage configured to store a first cache set including first sector data and second sector data, and a first dirty bit and a second dirty bit which are associated with the first sector data and the second sector data, respectively; and a buffer memory interface circuit configured to flush, based on a logic level of each of the first and second dirty bits, the first and second sector data to an external memory device, wherein, when the first dirty bit indicates a dirty state and the second dirty bit indicates a clean state, the buffer memory interface circuit masks the first sector data to generate first masked sector data, outputs the first masked sector data to the external memory device through a plurality of data lines during a first time period, and outputs the second sector data to the external memory device through the plurality of data lines during a second time period after the first time period, and wherein the buffer memory interface circuit is configured to:
- activate, based on a first operation code stored in a first mode register of the external memory device, a data mask function; and
- deactivate, based on a second operation code stored in a second mode register of the external memory device, a data bus inversion function.

10. The solid state drive controller of claim 9, wherein the buffer memory interface circuit is configured to transmit, before outputting the first and second sector data to the external memory device through a plurality of data lines connected thereto, a first mask write (MWR) command to the external memory device through command/address (CA) lines connected thereto.

11. The solid state drive controller of claim 9, wherein the buffer memory interface circuit is further configured to deactivate a mask signal to be output through a data mask line during the first and second time periods.

12. The solid state drive controller of claim 9, wherein a size of each of the first and second sector data is smaller than a size of a cache line, and wherein the size of the cache line is a minimum access unit of data to be transmitted to the external memory device in response to a write request of the buffer memory interface circuit.

13. A memory device comprising:
a memory cell array including a plurality of memory cells;
an input/output circuit configured to receive a plurality of sector data through a plurality of data lines; and
a control logic circuit configured to:
receive a first mask write (MWR) command through command/address (CA) lines;
receive a data mask signal through a data mask line;
selectively store the plurality of sector data in the memory cell array in response to the data mask signal, wherein the data mask signal is generated from an external memory controller based on a plurality of dirty bits associated with the plurality of sector data, respectively, and wherein, after receiving the first MWR command, the input/output circuit receives the plurality of sector data and the control logic circuit receives the data mask signal;
block, in response to a logic high level of the data mask signal, first sector data among the plurality of sector data from being stored in the memory cell array, the first sector data being received during a time when the data mask signal is at the logic high level; and
store, in response to a logic low level of the data mask signal, second sector data among the plurality of sector data in the memory cell array, the second sector data being received during a time when the data mask signal is at the logic low level.

14. The memory device of claim 13, further comprising:
a plurality of mode registers including a second mode register and a first mode register,
wherein the control logic circuit is configured to:
activate, based on a first operation code stored in the first mode register, a data mask function; and
deactivate, based on a second operation code stored in the second mode register, a data bus inversion function.

15. The memory device of claim 13, wherein, after a given time elapses from a time when the first MWR command is received, the input/output circuit receives the plurality of sector data through the plurality of data lines.

* * * * *